(12) United States Patent
Tanaka

(10) Patent No.: US 11,539,439 B2
(45) Date of Patent: Dec. 27, 2022

(54) OPTICAL TRANSCEIVER AND CONTROL METHOD THEREFOR

(71) Applicant: SUMITOMO ELECTRIC INDUSTRIES, LTD., Osaka (JP)

(72) Inventor: Hiromi Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/406,194

(22) Filed: Aug. 19, 2021

(65) Prior Publication Data

US 2022/0069913 A1 Mar. 3, 2022

(30) Foreign Application Priority Data

Aug. 27, 2020 (JP) ............................. JP2020-143758

(51) Int. Cl.
*H04B 10/40* (2013.01)
*G06F 9/4401* (2018.01)
*G06F 1/12* (2006.01)
*H04L 7/00* (2006.01)

(52) U.S. Cl.
CPC ............... *H04B 10/40* (2013.01); *G06F 1/12* (2013.01); *G06F 9/4403* (2013.01); *H04L 7/0075* (2013.01)

(58) Field of Classification Search
CPC ......... H04B 10/40; G06F 1/12; G06F 9/4403; H04L 7/0075
USPC ....................................................... 398/135
See application file for complete search history.

(56) References Cited

U.S. PATENT DOCUMENTS

| | | | |
|---|---|---|---|
| 2003/0002108 A1* | 1/2003 | Ames | H04B 10/6932 398/139 |
| 2005/0111845 A1* | 5/2005 | Nelson | H04B 10/672 398/138 |
| 2007/0280695 A1* | 12/2007 | Li | H04J 14/0227 398/135 |
| 2013/0339559 A1* | 12/2013 | Tanaka | G06F 13/4022 710/110 |
| 2016/0233961 A1* | 8/2016 | Huh | H04L 7/0075 |

FOREIGN PATENT DOCUMENTS

| | | |
|---|---|---|
| JP | 2005-229298 A | 8/2005 |
| JP | 2017-092769 A | 5/2017 |

\* cited by examiner

*Primary Examiner* — Dalzid E Singh
(74) *Attorney, Agent, or Firm* — Volpe Koenig

(57) ABSTRACT

An optical transceiver is pluggable to any one of a first apparatus and a second apparatus and includes a clock recovery circuit capable of regenerating a clock signal from an electrical signal, a memory storing a first program including a first transmission rate and a second program including a second transmission rate, and a processor executing a program with a higher priority level in a boot process. The processor sets a transmission rate of a program being executed to a transmission rate set value, and operates the clock recovery circuit. In accordance with an interrupt request, the processor sets, based on regeneration or non-regeneration of the clock signal, the priority level of the first or second program that is being executed to be lower than the priority level of the first or second program that is not being executed, and boots up.

6 Claims, 17 Drawing Sheets

OPTICAL TRANSCEIVER AND CONTROL METHOD THEREFOR

CROSS REFERENCES TO RELATED APPLICATIONS

The present invention contains subject matter related to Japanese Patent Application No. 2020-143758, filed in the Japan Patent Office on Aug. 27, 2020, the entire contents of which are incorporated herein by reference.

BACKGROUND OF THE DISCLOSURE

1. Field of the Invention

The present application relates to an optical transceiver and a control method therefor.

2. Description of the Related Art

Examples of optical transceivers (see, for example, Japanese Unexamined Patent Application Publication Nos. 2017-92769 and 2005-229298) detachable from a transmission apparatus include various types, such as small form-factor pluggable (SFP), quad small form-factor pluggable (QSFP), and C form-factor pluggable (CFP) that are defined by multi-source agreements (MSA). For example, standards such as QSFP-DD and QSFP28 with different transmission rates and the like are defined for QSFP.

SUMMARY OF THE DISCLOSURE

A transmission apparatus on which an optical transceiver is mounted may be switched to another type of transmission apparatus in the middle of operation in accordance with a change of demand for lines. For example, there may be a case in which a transmission apparatus complying with QSFP28 suitable for a demand for lines is used at the beginning of operation and switching to a transmission apparatus complying with QSFP-DD is performed in accordance with an increase in the demand for lines. For switching a transmission apparatus on which the optical transceiver is mounted from the transmission apparatus complying with QSFP28 to the transmission apparatus complying with QSFP-DD, it is desirable that the optical transceiver mounted on the transmission apparatus complying with QSFP28 be able to be reused on the transmission apparatus complying with QSFP-DD.

However, common management interface specification (CMIS) is used for a management interface for an optical transceiver and a transmission apparatus that comply with QSFP-DD, and small form-factor (SFF)-8636 is used for a management interface for an optical transceiver and a transmission apparatus that comply with QSFP28. That is, management interface specifications used for QSFP-DD and QSFP28 are different.

Thus, operation of a program for controlling communication with a transmission apparatus (host controller) differs between an optical transceiver complying with QSFP-DD and an optical transceiver complying with QSFP28, and a register configuration and address allocation in a memory space for communication between a host controller and an optical transceiver through an inter-integrated circuit (I2C) also differ between the optical transceiver complying with QSFP-DD and the optical transceiver complying with QSFP28. Therefore, an optical transceiver mounted on a transmission apparatus complying with QSFP28 cannot be directly reused on a transmission apparatus complying with QSFP-DD without rewriting a program.

Furthermore, in order that an optical transceiver mounted on a transmission apparatus complying with QSFP28 is reused on a transmission apparatus complying with QSFP-DD, a program corresponding to the transmission apparatus may be downloaded and rewritten to the optical transceiver. Because a user has to spend time and effort for such a downloading operation, it is not easy to switch a program.

Accordingly, it is an object of the present disclosure to provide an optical transceiver that is capable of easily switching a program according to a transmission apparatus on which the optical transceiver is mounted and a control method for the optical transceiver.

An optical transceiver according to the present disclosure is an optical transceiver that is pluggable to any one of a first apparatus that transmits a first electrical signal at a first transmission rate and a second apparatus that transmits a second electrical signal at a second transmission rate different from the first transmission rate. The optical transceiver includes a clock recovery circuit that is capable of regenerating a clock signal from any one of the first electrical signal transmitted at the first transmission rate and the second electrical signal transmitted at the second transmission rate; a memory that stores a first program including a value of the first transmission rate and a second program including a value of the second transmission rate; and a processor that executes one of the first program and the second program that has a higher priority level, in a boot process. The clock recovery circuit does not regenerate the clock signal in a case where a transmission rate real value which becomes the value of the first transmission rate when the optical transceiver is plugged to the first apparatus or alternatively the value of the second transmission rate of the first electrical signal when the optical transceiver is plugged to the second apparatus is different from a transmission rate set value, and the clock recovery circuit regenerates the clock signal in a case where the transmission rate real value is equal to the transmission rate set value. In a case where the optical transceiver is plugged to one of the first apparatus and the second apparatus, the processor boots up and executes one of the first program and the second program that has a higher priority level, sets the value of the first transmission rate or the value of the second transmission rate included in the first program or the second program that is being executed to the transmission rate set value, and operates the clock recovery circuit. In a case where the clock recovery circuit does not regenerate the clock signal from the first electrical signal or the second electrical signal transmitted from the first apparatus or the second apparatus, in accordance with an interrupt request from the first apparatus or the second apparatus to which the optical transceiver is plugged, the processor sets the priority level of the first program or the second program that is being executed to be lower than the priority level of the first program or the second program that is not being executed, and boots up.

A control method according to the present disclosure is a control method for an optical transceiver pluggable to any one of a first apparatus that transmits a first electrical signal at a first transmission rate and a second apparatus that transmits a second electrical signal at a second transmission rate different from the first transmission rate. The optical transceiver includes a clock recovery circuit that is capable of regenerating a clock signal from any one of the first electrical signal transmitted at the first transmission rate and the second electrical signal transmitted at the second transmission rate, a memory that stores a first program including a value of the first transmission rate and a second program including a value of the second transmission rate, and a processor that is capable of executing any one of the first program and the second program. The clock recovery circuit does not regenerate the clock signal in a case where a transmission rate real value which becomes the value of the first transmission rate when the optical transceiver is plugged to the first apparatus or alternatively the value of the second transmission rate when the optical transceiver is plugged to the second apparatus is different from a transmission rate set value, and the clock recovery circuit regenerates the clock signal in a case where the transmission rate real value is equal to the transmission rate set value. In a case where the optical transceiver is plugged to one of the first apparatus and the second apparatus, the optical transceiver executes one of the first program and the second program that has a higher priority level, so that the processor sets the value of the first transmission rate or the value of the second transmission rate included in the first program or the second program that is being executed to the transmission rate set value and operates the clock recovery circuit. In a case where the clock recovery circuit does not regenerate the clock signal from the first electrical signal or the second electrical signal transmitted from the first apparatus or the second apparatus to which the optical transceiver is plugged, in accordance with an interrupt request from the first apparatus or the second apparatus to which the optical transceiver is plugged, the processor sets the priority level of the first program or the second program that is being executed to be lower than the priority level of the first program or the second program that is not being executed, and boots up.

DESCRIPTION OF THE PREFERRED EMBODIMENTS

Figure 1A:
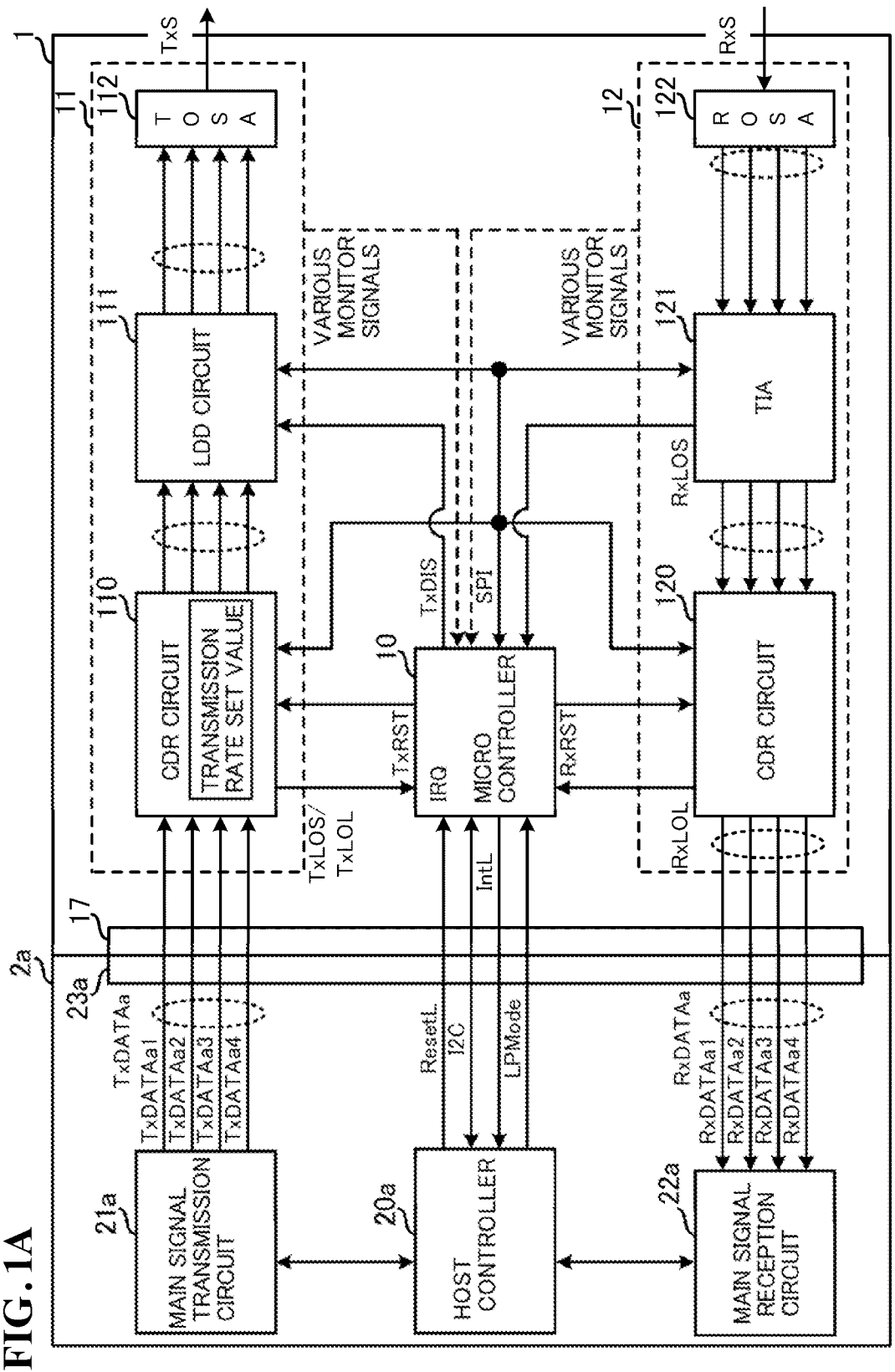
FIG. 1A is a diagram illustrating an example of an optical transceiver connected to a transmission apparatus with a transmission rate of 100 Gbps.

Explanation of Embodiments of the Present Disclosure

First, embodiments of the present disclosure will be listed and described.

(1) An optical transceiver according to the present disclosure that is pluggable to any one of a first apparatus that transmits a first electrical signal at a first transmission rate and a second apparatus that transmits a second electrical signal at a second transmission rate different from the first transmission rate, includes a clock recovery circuit that is capable of regenerating a clock signal from any one of the first electrical signal transmitted at the first transmission rate and the second electrical signal transmitted at the second transmission rate; a memory that stores a first program including a value of the first transmission rate and a second program including a value of the second transmission rate; and a processor that executes one of the first program and the second program that has a higher priority level, in a boot process. The clock recovery circuit does not regenerate the clock signal in a case where a transmission rate real value which becomes the value of the first transmission rate when the optical transceiver is plugged to the first apparatus or alternatively the value of the second transmission rate when the optical transceiver is plugged to the second apparatus is different from a transmission rate set value, and the clock recovery circuit regenerates the clock signal in a case where the transmission rate real value is equal to the transmission rate set value. In a case where the optical transceiver is plugged to one of the first apparatus and the second apparatus, the processor boots up and executes one of the first program and the second program that has a higher priority level, sets the value of the first transmission rate or the value of the second transmission rate included in the first program or the second program that is being executed to the transmission rate set value, and operates the clock recovery circuit. In a case where the clock recovery circuit does not regenerate the clock signal from the first electrical signal or the second electrical signal transmitted from the first apparatus or the second apparatus, in accordance with an interrupt request from the first apparatus or the second apparatus to which the optical transceiver is plugged, the processor sets the priority level of the first program or the second program that is being executed to be lower than the priority level of the first program or the second program that is not being executed, and boots up.

Thus, the optical transceiver is capable of easily switching a program in accordance with an apparatus on which the optical transceiver is mounted.

(2) The clock recovery circuit may output a first alarm signal indicating non-regeneration of the clock signal to the processor. The processor may determine, based on the first alarm signal from the clock recovery circuit, whether or not the clock signal is regenerated.

Thus, the processor is able to receive, at an appropriate timing from the clock recovery circuit, a notification indicating whether or not phase synchronization is succeeded.

(3) In a case where the processor determines that the clock recovery circuit does not regenerate the clock signal, the processor may reset the clock recovery circuit prior to the boot process.

Thus, the processor is able to appropriately control the relation between the timing of restart of the clock recovery circuit and the timing of execution of the first program or the second program.

(4) The processor may receive from the clock recovery circuit a second alarm signal indicating whether or not the first electrical signal or the second electrical signal is input from the first apparatus or the second apparatus to which the optical transceiver is plugged. In a case where the processor determines, based on the second alarm signal, that the clock signal is not regenerated in a state in which the first electrical signal or the second electrical signal is input to the clock recovery circuit, in accordance with the interrupt request, the processor may change priority level such that the priority level of the first program or the second program that is being executed is lower than the priority level of the first program or the second program that is not being executed, and boots up. In a case where the processor determines that the clock signal is not regenerated in a state in which neither the first electrical signal nor the second electrical signal is input to the clock recovery circuit, the processor may maintain the priority level of the first program or the second program that is being executed to be higher than the priority level of the first program or the second program that is not being executed.

Thus, for example, a situation in which a program with a wrong operation configuration is executed in a case where the first apparatus or the second apparatus is in the process of startup and cannot output the first electrical signal or the second electrical signal, is prevented.

(5) During execution of the first program, the processor may transmit and receive information regarding monitoring and control to and from the first apparatus in accordance with a first specification. During execution of the second program, the processor may transmit and receive information regarding monitoring and control to and from the second apparatus in accordance with a second specification.

Thus, by switching between the first program and the second program, the processor is able to perform monitoring and control in accordance with the first specification or the second specification that corresponds to the transmission rate of the apparatus.

(6) In a control method according to the present disclosure for an optical transceiver pluggable to any one of a first apparatus that transmits a first electrical signal at a first transmission rate and a second apparatus that transmits a second electrical signal at a second transmission rate different from the first transmission rate, the optical transceiver includes a clock recovery circuit that is capable of regenerating a clock signal from any one of the first electrical signal transmitted at the first transmission rate and the second electrical signal transmitted at the second transmission rate, a memory that stores a first program including a value of the first transmission rate and a second program including a value of the second transmission rate, and a processor that is capable of executing any one of the first program and the second program. The clock recovery circuit does not regenerate the clock signal in a case where a transmission rate real value which becomes the value of the first transmission rate which the optical transceiver is plugged to the first apparatus or alternatively the value of the second transmission rate when the optical transceiver is plugged to the second apparatus is different from a transmission rate set value, and the clock recovery circuit regenerates the clock signal in a case where the transmission rate real value is equal to the transmission rate set value. In a case where the optical transceiver is plugged to one of the first apparatus and the second apparatus, the optical transceiver executes one of the first program and the second program that has a higher priority level, so that the processor sets the value of the first transmission rate or the value of the second transmission rate included in the first program or the second program that is being executed to the transmission rate set value and operates the clock recovery circuit. In a case where the clock recovery circuit does not regenerate the clock signal from the first electrical signal or the second electrical signal transmitted from the first apparatus or the second apparatus to which the optical transceiver is plugged, in accordance with an interrupt request from the first apparatus or the second apparatus to which the optical transceiver is plugged, the processor sets the priority level of the first program or the second program that is being executed to be lower than the priority level of the first program or the second program that is not being executed, and boots up.

Thus, the control method for the optical transceiver is capable of easily switching a program in accordance with an apparatus on which the optical transceiver is mounted.

Details of Embodiments of the Present Disclosure

Specific examples of an optical transceiver 1 and a control method for the optical transceiver 1 according to embodiments of the present disclosure will be described below with reference to drawings. The present invention is not limited to the examples described below, but is defined by the claims, and all modifications equivalent to and within the scope of the claims are intended to be encompassed.

In an embodiment, an optical transceiver 1 detachable from a transmission apparatus 2a complying with QSFP28 and a transmission apparatus 2b complying with QSFP-DD will be described. The transmission rate of the optical transceiver 1 can be switched according to the transmission apparatus 2a or the transmission apparatus 2b on which the optical transceiver 1 is mounted, by switching a program according to the transmission apparatus on which the optical transceiver 1 is mounted. The optical transceiver 1 is, for example, a pluggable optical transceiver. The optical transceiver 1 may be plugged into a cage of the transmission apparatus 2a or 2b and removed from the cage. An example of the configuration of the optical transceiver 1 will be described below.

Figure 1B:
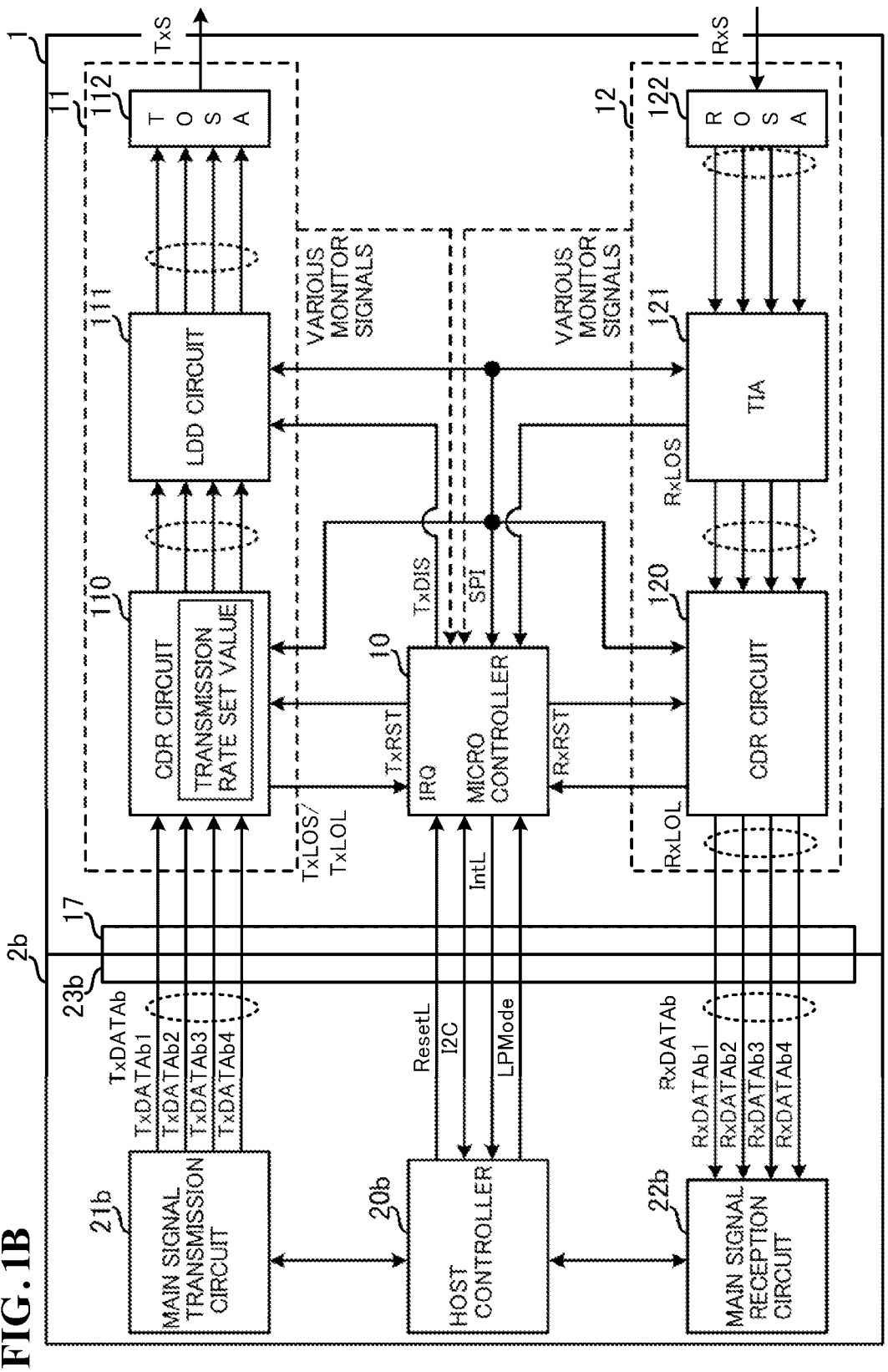
FIG. 1B is a diagram illustrating an example of an optical transceiver connected to a transmission apparatus with a transmission rate of 200 Gbps.

FIG. 1A is a diagram illustrating an example of an optical transceiver connected to a transmission apparatus with a transmission rate of 100 Gbps. FIG. 1B is a diagram illustrating an example of an optical transceiver connected to a transmission apparatus with a transmission rate of 200 Gbps. Hereinafter, transmission rate may be expressed as a nominal value by truncating low-order digit(s).

In FIG. 1A, a configuration of the optical transceiver 1 and a configuration of the transmission apparatus 2a on which the optical transceiver 1 is mounted are illustrated. In FIG. B, a configuration of the optical transceiver 1 and a configuration of the transmission apparatus 2b on which the optical transceiver 1 is mounted are illustrated. For example, the transmission apparatus 2a and the transmission apparatus 2b are installed in a data center for providing a cloud service and are used for communication with other data centers or communication with servers within the data center where the transmission apparatus 2a and the transmission apparatus 2b are installed.

First, a transmission data signal and a reception data signal for the transmission apparatus 2a and the transmission apparatus 2b on which the optical transceiver 1 is mounted will be explained. The transmission apparatus 2a is an example of a first apparatus and the transmission apparatus 2b is an example of a second apparatus.

Transmission Data Signal and Reception Data Signal for Transmission Apparatus 2a The transmission apparatus 2a complies with QSFP28. The transmission apparatus 2a transmits a transmission data signal TxDATAa with a transmission rate of 100 G (100 Gbps). The transmission apparatus 2a receives a reception data signal RxDATAa with a transmission rate of 100 G.

The transmission data signal TxDATAa includes four non-return-to-zero (NRZ) signals, TxDATAa1, TxDATAa2, TxDATAa3, and TxDATAa4, with a transmission rate of 25 Gbps. That is, the transmission apparatus 2a transmits the NRZ signals TxDATAa1, TxDATAa2, TxDATAa3, and TxDATAa4 with a transmission rate of 25 Gbps per lane, on four lanes in total. The NRZ signals TxDATAa1, TxDATAa2, TxDATAa3, and TxDATAa4 are examples of first electrical signals. A transmission rate of 25 Gbps is an example of a first transmission rate.

As with the transmission data signal TxDATAa, the reception data signal RxDATAa includes four NRZ signals, RxDATAa1, RxDATAa2, RxDATAa3, and RxDATAa4, with a transmission rate of 25 Gbps. That is, the transmission apparatus 2a receives the NRZ signals RxDATAa1, RxDATAa2, RxDATAa3, and RxDATAa4 with a transmission rate of 25 Gbps per lane, on four lanes in total.

The transmission apparatus 2a transmits the transmission data signal TxDATAa and receives the reception data signal RxDATAa. Therefore, the transmission rate of the transmission apparatus 2a is 100 Gbps.

Transmission Data Signal and Reception Data Signal for Transmission Apparatus 2b The transmission apparatus 2b complies with QSFP-DD. The transmission apparatus 2b transmits a transmission data signal TxDATAb with a transmission rate of 200 G (200 Gbps). The transmission apparatus 2b receives a reception data signal RxDATAb with a transmission rate of 200 G.

The transmission data signal TxDATAb includes four pulse amplifier modulation 4 (PAM4) signals, TxDATAb1, TxDATAb2, TxDATAb3, and TxDATAb4, with a symbol rate of 26 (Gbaud). A PAM4 signal transmits information of two bits in a single modulation. That is, the transmission apparatus 2a transmits the PAM4 signals TxDATAb1, TxDATAb2, TxDATAb3, and TxDATAb4 with a transmission rate of 52 Gbps per lane, on four lanes in total. The PAM4 signals TxDATAb1, TxDATAb2, TxDATAb3, and TxDATAb4 are examples of second electrical signals. A transmission rate of 52 Gbps is an example of a second transmission rate.

As with the transmission data signal TxDATAb, the reception data signal RxDATAb includes four PAM4 signals, RxDATAb1, RxDATAb2, RxDATAb3, and RxDATAb4, with a transmission rate of 52 Gbps. That is, the transmission apparatus 2b receives the PAM4 signals RxDATAb1, RxDATAb2, RxDATAb3, and RxDATAb4 with a transmission rate of 52 Gbps per lane, on four lanes in total.

The transmission apparatus 2b transmits the transmission data signal TxDATAb and receives the reception data signal RxDATAb. Therefore, the transmission rate of the transmission apparatus 2b is 200 Gbps.

Configuration of Optical Transceiver 1

Next, the optical transceiver 1 will be described.

The optical transceiver 1 is detachable from the transmission apparatus 2a and the transmission apparatus 2b. The optical transceiver 1 is plugged into the transmission apparatus 2a or the transmission apparatus 2b, that is, mounted on the transmission apparatus 2a or the transmission apparatus 2b. For example, the optical transceiver 1 is a pluggable optical transceiver and may be hot-inserted into and hot-removed from the cage of the transmission apparatus 2a or 2b.

The optical transceiver 1 includes a microcontroller 10, a transmission circuit 11, and a reception circuit 12. The optical transceiver 1 also includes a connector 17 that is able to be connected to each of the transmission apparatus 2a and the transmission apparatus 2b.

The microcontroller 10 executes a program to monitor the optical transceiver 1 and control the entire optical transceiver 1. For example, the microcontroller 10 performs settings for operation of the transmission circuit 11 and the reception circuit 12. Furthermore, the microcontroller 10 collects information on the operation state of the transmission circuit 11 and the reception circuit 12 from the transmission circuit 11 and the reception circuit 12. The microcontroller 10 also changes settings for the operation in accordance with the collected information. Furthermore, the microcontroller 10 communicates with the transmission apparatus 2a or the transmission apparatus 2b on which the optical transceiver 1 is mounted.

The transmission circuit 11 performs transmission processing for generating a transmission optical signal from a transmission data signal transmitted from the transmission apparatus 2a or the transmission apparatus 2b on which the optical transceiver 1 is mounted. The transmission circuit 11 generates a transmission optical signal TxS from an electrical transmission data signal TxDATAa or TxDATAb.

The transmission circuit 11 includes a CDR circuit 110, a laser diode driver (LDD) circuit 111, and a transmitter optical subassembly (TOSA) 112. Inside the transmission circuit 11, for example, the transmission data signal TxDATAa or the transmission data signal TxDATAb is transmitted over four lanes in a parallel manner.

The reception circuit 12 performs reception processing for generating, from a received reception optical signal, a reception data signal for the transmission apparatus 2a or the transmission apparatus 2b. The reception circuit 12 generates an electrical reception data signal RxDATAa or RxDATAb from a reception optical signal RxS.

The reception circuit 12 includes a CDR circuit 120, a transimpedance amplifier (TIA) 121, and a receiver optical subassembly (ROSA) 122. Inside the reception circuit 12, for example, the reception data signal RxDATAa or the reception data signal RxDATAb is transmitted over four lanes in a parallel manner.

The optical transceiver 1 is electrically connected, through the connector 17, to the transmission apparatus 2a or the transmission apparatus 2b on which the optical transceiver 1 is mounted. In the case where the optical transceiver 1 is mounted on the transmission apparatus 2a, the transmission data signal TxDATAa is input from the transmission apparatus 2a through the connector 17 to the transmission circuit 11, and the reception data signal RxDATAa is output from the reception circuit 12 through the connector 17 to the transmission apparatus 2a. The connector 17 includes a plurality of electrical terminals. In this case, the transmission data signal TxDATAa is a real transmission data signal which the optical transceiver 1 receives from the transmission apparatus 2a.

In the case where the optical transceiver 1 is mounted on the transmission apparatus 2b, the transmission data signal TxDATAb is input from the transmission apparatus 2b through the connector 17 to the transmission circuit 11, and the reception data signal RxDATAb is output from the reception circuit 12 through the connector 17 to the transmission apparatus 2b. In this case, the transmission data signal TxDATAb is the real transmission data signal that the optical transceiver 1 receives from the transmission apparatus 2b. Accordingly, the real transmission signal becomes the transmission data signal TxDATAa when the optical transceiver is mounted on the transmission apparatus 2a or alternatively the transmission data signal TxDATAb when the optical transceiver is mounted on the transmission apparatus 2b.

The optical transceiver 1 is electrically connected through the connector 17 to the transmission apparatus 2a or the transmission apparatus 2b. The transmission data signal TxDATAa or the transmission data signal TxDATAb is input from the transmission apparatus 2a or the transmission apparatus 2b through the connector 17 to the transmission circuit 11. The reception data signal RxDATAa or the reception data signal RxDATAb is output from the reception circuit 12 through the connector 17 to the transmission apparatus 2a or the transmission apparatus 2b.

Transmission Apparatus 2a and Transmission Apparatus 2b

The transmission apparatus 2a with a transmission rate of 100 Gbps includes, for example, a host controller 20a, a main signal transmission circuit 21a, and a main signal reception circuit 22a. The transmission apparatus 2a also includes a connector 23a for connecting to the optical transceiver 1. The transmission apparatus 2b with a transmission rate of 200 Gbps includes, for example, a host controller 20b, a main signal transmission circuit 21b, and a main signal reception circuit 22b. The transmission apparatus 2b also includes a connector 23b for connecting to the optical transceiver 1.

The connector 17 of the optical transceiver 1 can be engaged with the connector 23a of the transmission apparatus 2a or the connector 23b of the transmission apparatus 2b. Engagement between the connector 17 of the optical transceiver 1 and the connector 23a of the transmission apparatus 2a allows the main signal transmission circuit 21a to be electrically connected to the transmission circuit 11, the main signal reception circuit 22a to be electrically connected to the reception circuit 12, and the host controller 20a to be electrically connected to the microcontroller 10.

Engagement between the connector 17 of the optical transceiver 1 and the connector 23b of the transmission apparatus 2b allows the main signal transmission circuit 21b to be electrically connected to the transmission circuit 11, the main signal reception circuit 22b to be electrically connected to the reception circuit 12, and the host controller 20b to be electrically connected to the microcontroller 10.

The main signal transmission circuit 21a transmits the NRZ signals TxDATAa1, TxDATAa2, TxDATAa3, and TxDATAa4 with a transmission rate of 25 Gbps per lane, that is, the transmission data signal TxDATAa with a transmission rate of 100 Gbps, in parallel to the CDR circuit 110 through the connector 23a. When the optical transceiver 1 is mounted on the transmission apparatus 2a, the real transmission data signal received by the optical transceiver 1 becomes the transmission data signal TxDATAa. A transmission rate real value corresponds to the value of the real transmission data signal. Accordingly, the transmission rate real value becomes 25 Gbps, when the optical transceiver 1 is mounted on the transmission apparatus 2a. The main signal transmission circuit 21b transmits the PAM4 signals TxDATAb1, TxDATAb2, TxDATAb3, and TxDATAb4 with a transmission rate of 52 Gbps per lane, that is, the transmission data signal TxDATAb with a transmission rate of 200 Gbps, in parallel to the CDR circuit 110 through the connector 23b. The accurate transmission rate of the transmission data signal TxDATAb is 208 Gbps. When the optical transceiver 1 is mounted on the transmission apparatus 2b, the real transmission data signal received by the optical transceiver 1 is the transmission data signal TxDATAb. The transmission rate real value corresponds to the value of the real transmission data signal. Accordingly, the transmission rate real value becomes 52 Gbps, when the optical transceiver 1 is mounted on the transmission apparatus 2b. In the explanation provided below, however, for the sake of simplification, the transmission rate of the transmission data signal TxDATAb will be regarded as 200 Gbps.

The main signal reception circuit 22a receives the NRZ signals RxDATAa1, RxDATAa2, RxDATAa3, and RxDATAa4 with a transmission rate of 25 Gbps per lane, that is, the reception data signal RxDATAa with a transmission rate of 100 Gbps, in parallel from the CDR circuit 120 through the connector 23a. The main signal reception circuit 22b receives the PAM4 signals RxDATAb1, RxDATAb2, RxDATAb3, and RxDATAb4 with a transmission rate of 52 Gbps per lane, that is, the reception data signal RxDATAb with a transmission rate of 200 Gbps, in parallel from the CDR circuit 120 through the connector 23b.

The host controller 20a controls, for example, the main signal transmission circuit 21a and the main signal reception circuit 22a. The host controller 20b controls, for example, the main signal transmission circuit 21b and the main signal reception circuit 22b. Each of the host controller 20a and the host controller 20b transmits and receives various control signals to and from the microcontroller 10.

Each of the host controller 20a and the host controller 20b outputs a reset signal ResetL to the microcontroller 10 as necessary. The reset signal ResetL is, for example, input to an interrupt request port IRQ of the microcontroller 10.

When the reset signal ResetL is input to the interrupt request port IRQ, the microcontroller 10 performs an interrupt process. A reset signal ResetL is an example of an interrupt request for requesting an interrupt process.

For example, when it is detected that the connector 17 of the optical transceiver 1 is electrically connected to the connector 23a, the host controller 20a outputs the reset signal ResetL. When it is detected that the connector 17 of the optical transceiver 1 is electrically connected to the connector 23a, the host controller 20a causes the main signal transmission circuit 21a to transmit the transmission data signal TxDATAa.

For example, when it is detected that the connector 17 of the optical transceiver 1 is electrically connected to the connector 23*b*, the host controller 20*b* outputs the reset signal ResetL. When it is detected that the connector 17 of the optical transceiver 1 is electrically connected to the connector 23*b*, the host controller 20*b* causes the main signal transmission circuit 21*b* to transmit the transmission data signal TxDATAb.

As described later, the microcontroller 10 performs the interrupt process in accordance with the reset signal ResetL. Thus, the microcontroller 10 boots and executes a program corresponding to the transmission apparatus 2*a* or a program corresponding to the transmission apparatus 2*b*. The microcontroller 10 holds the program corresponding to the transmission apparatus 2*a* and the program corresponding to the transmission apparatus 2*b*. The program corresponding to the transmission apparatus 2*a* is an example of a first program. The program corresponding to the transmission apparatus 2*b* is an example of a second program.

Each of the host controller 20*a* and the host controller 20*b* communicates with the microcontroller 10, for example, through an I2C bus I2C. In the case where abnormality of the transmission circuit 11 and the reception circuit 12 is detected, the microcontroller 10 outputs an alarm signal IntL to the host controller 20*a* or the host controller 20*b* to which the microcontroller 10 is connected. Each of the host controller 20*a* and the host controller 20*b* outputs a mode signal LPMode, which causes the optical transceiver 1 to operate in a low power consumption mode, for example, in the case where a main signal is not transmitted or received, to the microcontroller 10.

The CDR circuit 110 has transmission rate set values. The CDR circuit 110 extracts clock signals, in accordance with transmission rates represented by the transmission rate set values, from signals on individual lanes of the transmission data signal TxDATAa or TxDATAb from the main signal transmission circuit 21*a* or the main signal transmission circuit 21*b*, and performs waveform shaping of the signals on the individual lanes of the transmission data signal TxDATAa or TxDATAb. Extraction of clock signals may also be referred to as regeneration of clock signals for regenerating clock signals at the time when signals on individual lanes of the transmission data signal TxDATAa or TxDATAb are generated.

Figure 1C:
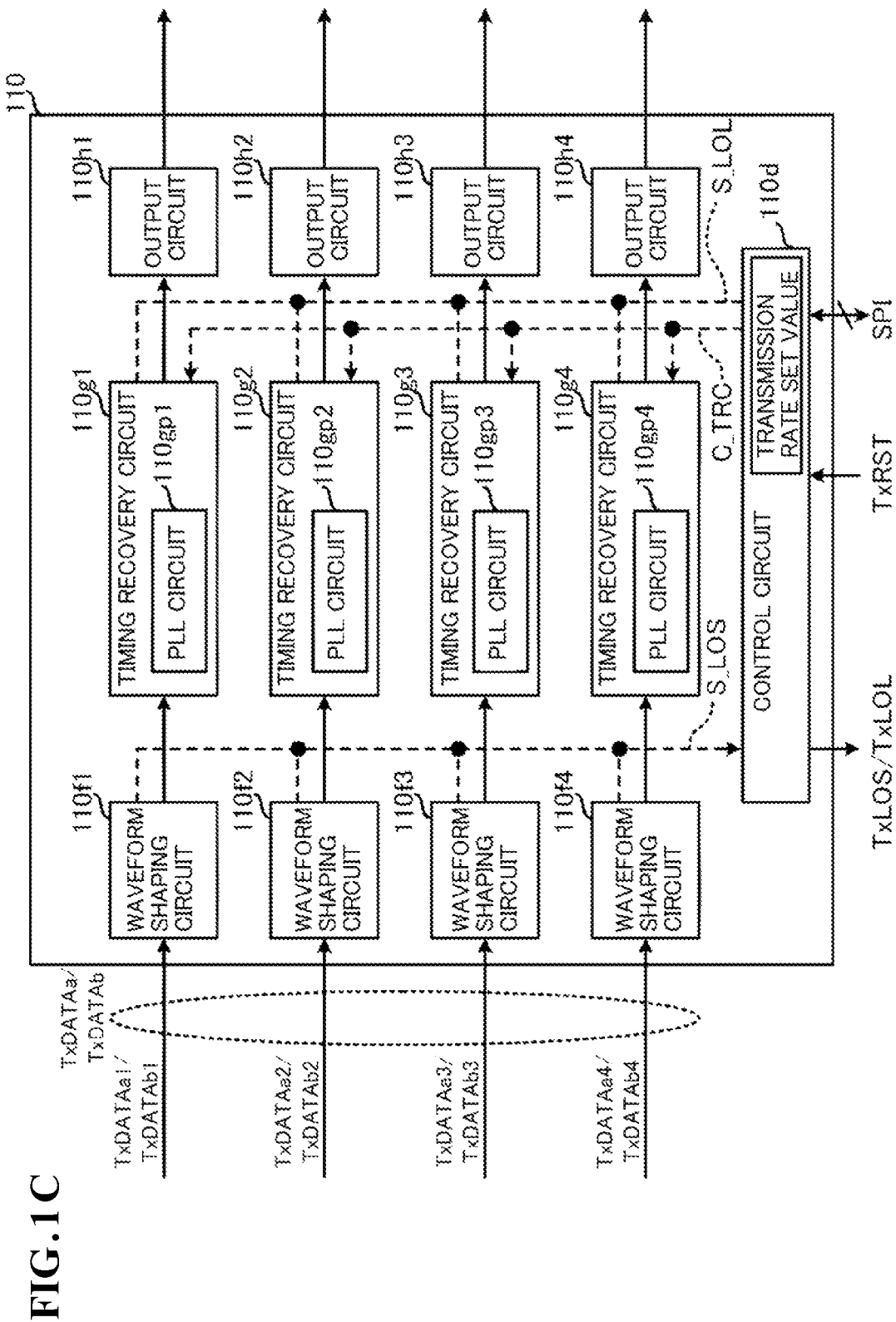
FIG. 1C is a block diagram illustrating the configuration of an example of a clock data recovery (CDR) circuit of an optical transceiver.

FIG. 1C is a block diagram illustrating an example of the configuration of the CDR circuit 110 of the optical transceiver 1. The CDR circuit 110 includes waveform shaping circuits 110*f*1 to 110*f*4, timing recovery circuits 110*g*1 to 110*g*4, output circuits 110*h*1 to 110*h*4, and a control circuit 110*d*. The CDR circuit 110 includes a waveform shaping circuit, a timing recovery circuit, and an output circuit for each lane.

Specifically, the CDR circuit 110 includes the waveform shaping circuit 110*f*1, the timing recovery circuit 110*g*1, and the output circuit 110*h*1 for processing the NRZ signal TxDATAa1 or the PAM4 signal TxDATAb1 on the first lane. The CDR circuit 110 includes the waveform shaping circuit 110*f*2, the timing recovery circuit 110*g*2, and the output circuit 110*h*2 for processing the NRZ signal TxDATAa2 or the PAM4 signal TxDATAb2 on the second lane.

As with the first lane and the second lane, the CDR circuit 110 includes the waveform shaping circuit 110*f*3, the timing recovery circuit 110*g*3, and the output circuit 110*h*3 for processing the NRZ signal TxDATAa3 or the PAM4 signal TxDATAb4 on the third lane. The CDR circuit 110 includes the waveform shaping circuit 110*f*4, the timing recovery circuit 110*g*4, and the output circuit 110*h*4 for processing the NRZ signal TxDATAa4 or the PAM4 signal TxDATAb4 on the fourth lane.

The waveform shaping circuits 110*f*1 to 110*f*4 are, for example, equalizer circuits and shape the waveforms of signals transmitted from the transmission apparatus 2*a* or the transmission apparatus 2*b*. In the case where the signal strength of input signals is less than or equal to a predetermined value, the waveform shaping circuits 110*f*1 to 110*f*4 output loss of signal (LOS) signals S_LOS to the control circuit 110*d*.

For example, the waveform shaping circuit 110*f*1 shapes the waveform of the NRZ signal TxDATAa1 or the PAM4 signal TxDATAb1 transmitted from the transmission apparatus 2*a* or the transmission apparatus 2*b*. The waveform shaping circuit 110*f*1 also determines whether or not the signal strength of the NRZ signal TxDATAa1 or the PAM4 signal TxDATAb1 transmitted from the transmission apparatus 2*a* or the transmission apparatus 2*b* is less than or equal to the predetermined value.

In the case where the signal strength of the NRZ signal TxDATAa1 or the PAM4 signal TxDATAb1 transmitted from the transmission apparatus 2*a* or the transmission apparatus 2*b* is less than or equal to the predetermined value, the waveform shaping circuit 110*f*1 outputs the LOS signal S_LOS to the control circuit 110*d*. The waveform shaping circuits 110*f*2 to 110*f*4 perform processing in a similar manner.

The timing recovery circuits 110*g*1 to 110*g*4 generate, using phase locked loop (PLL) circuits, clock signals from signals input from the waveform shaping circuits 110*f*1 to 110*f*4, and regenerate the timing of the NRZ signal TxDATAa1 or the PAM4 signal TxDATAb1 in accordance with the generated clock signals. The timing recovery circuits 110*g*1 to 110*g*4 include PLL circuits 110*gp*1 to 110*gp*4, respectively. The PLL circuits 110*gp*1 to 110*gp*4 include oscillators that oscillate at set frequencies and the like. Inside the PLL circuits 110*gp*1 to 110*gp*4 of the timing recovery circuits 110*g*1 to 110*g*4, frequencies of the oscillators inside the PLL circuits 110*gp*1 to 110*gp*4 are set in accordance with a control signal C_TRC from the control circuit 110*d*.

For example, the PLL circuits 110*gp*1 to 110*gp*4 adjust the frequencies of the oscillators inside the PLL circuits 110*gp*1 to 110*gp*4 to synchronize transmission rates of signals input from the waveform shaping circuits 110*f*1 to 110*f*4 and fix the phases of the clock signals output from the oscillators with respect to the phases of the input signals. For example, in the case where the frequency (or transmission rate) of an input signal is within a predetermined range with respect to the set frequency of an oscillator inside a PLL circuit, the PLL circuit can be locked to the input signal. For example, in the case where an input signal is an NRZ signal with a transmission rate of 25 Gbps, a PLL circuit regenerates a clock signal at 50 GHz.

In the case where the PLL circuits 110*gp*1 to 110*gp*4 are not able to be locked at preset frequencies, the timing recovery circuits 110*g*1 to 110*g*4 output loss of lock (LOL) signals S_LOL to the control circuit 110*d*. For example, in the case where the frequency of an input signal is outside the predetermined frequency range with respect to the set frequency of an oscillator inside a PLL circuit, the PLL circuit is not able to be locked to the input signal and outputs the LOL signal S_LOL.

Types of signals (for example, NRZ and PAM4, etc.) to be input to the PLL circuits 110*gp*1 to 110*gp*4 may be set. In the case where the set type of a signal is different from the type of a signal actually input, the PLL circuit might not be locked. That is, each of the timing recovery circuits 110g1 to 110g4 may determine a transmission rate in accordance with the type of an input signal.

The output circuits 110h1 to 110h4 are circuits for driving output load and output signals output from the timing recovery circuits 110g1 to 110g4 to the LDD circuit 111.

The control circuit 110d controls the entire CDR circuit 110. The control circuit 110d communicates with the microcontroller 10 and transmits and receives signals to and from the microcontroller 10.

The control circuit 110d receives, for example, LOS signals S_LOS from the waveform shaping circuits 110f1 to 110f4. The control circuit 110d outputs a LOS signal TxLOS, which is an alarm signal, to the microcontroller 10 in accordance with the received LOS signals S_LOS. For example, in the case where the control circuit 110d receives a LOS signal S_LOS from at least one of the waveform shaping circuits 110f1 to 110f4, the LOS signal TxLOS may be set to Low level. In this case, "Low level" indicates that an alarm indicating that no signal is input is given. In other words, in the case where the control circuit 110d receives a LOS signal S_LOS from none of the waveform shaping circuits 110f1 to 110f4, the LOS signal TxLOS may be set to High level. In this case, "High level" indicates that a transmission data signal TxDATAa or TxDATAb is input to the optical transceiver 1 normally. A LOS signal TxLOS is an example of a second alarm signal indicating whether or not a transmission data signal TxDATAa or a transmission data signal TxDATAb is input to the CDR circuit 110 from the transmission apparatus 2a or the transmission apparatus 2b on which the optical transceiver 1 is mounted.

Furthermore, the control circuit 110d receives LOL signals S_LOL from the timing recovery circuits 110g1 to 110g4. The control circuit 110d outputs a LOL signal TxLOL, which is an alarm signal, to the microcontroller 10 in accordance with the received LOL signals S_LOL. For example, in the case where the control circuit 110d receives a LOL signal S_LOL from at least one of the timing recovery circuits 110g1 to 110g4, the LOL signal TxLOL may be set to Low level. In this case, "Low level" indicates that a clock signal is not regenerated on at least one lane. In other words, in the case where the control circuit 110d receives a LOL signal S_LOL from none of the timing recovery circuits 110g1 to 110g4, the LOL signal TxLOL may be set to High level. In this case, "High level" indicates that clock signals are regenerated on all the four lanes. A LOL signal TxLOL is an example of a first alarm signal indicating a result of success of clock regeneration. That is, in the case where a LOL signal TxLOL is at High level, the CDR circuit 110 regenerates clock signals. In the case where a LOL signal TxLOL is at Low level, the CDR circuit 110 does not regenerate one or more clock signals on four.

The control circuit 110d receives transmission rate set values and the like from the microcontroller 10 through a serial peripheral interface (SPI) bus SPI. For example, the control circuit 110d sets, on the basis of the transmission rate set values received from the microcontroller 10, frequencies of the oscillators inside the PLL circuits, in accordance with the control signal C_TRC, for the timing recovery circuits 110g1 to 110g4. The control circuit 110d may set, on the basis of the transmission rate set values received from the microcontroller 10, types of input signals for the timing recovery circuits 110g1 to 110g4. Accordingly, the CDR circuit 110 performs clock regeneration from signals on individual lanes of the transmission data signal TxDATAa or the transmission data signal TxDATAb in accordance with the transmission rate set values. In the case where the transmission rate set values are equal to transmission rates of the signals on the lanes of the transmission data signal TxDATAa or the transmission data signal TxDATAb, the PLL circuits 110gp1 to 110gp4 regenerate clock signals. In contrast, in the case where the transmission rate set values are different from transmission rates of the signals on the lanes of the transmission data signal TxDATAa or the transmission data signal TxDATAb, the PLL circuits 110gp1 to 110gp4 do not regenerate clock signals. That is, in the case where transmission rates (transmission rate set value) corresponding to the frequencies set for the oscillators inside the PLL circuits are equal to the transmission rates of the transmission data signals, the PLL circuits regenerate clock signals. However, in the case where the transmission rate set values are different from the transmission rates of the transmission data signals, the PLL circuits do not regenerate clock signals. The CDR circuit 110 is an example of a clock recovery circuit.

When a reset signal TxRST is input from the microcontroller 10, the control circuit 110d resets the CDR circuit 110. After the power is turned on or reset is performed, the CDR circuit 110 receives transmission rate set values from the microcontroller 10 and sets the frequencies of the oscillator inside the PLL circuits and types of input signals.

As illustrated in FIG. 1A or 1B, the LDD circuit 111 generates, for individual lanes, driving signals for driving light-emitting elements (laser diodes) from the transmission data signal TxDATAa or the transmission data signal TxDATAb, and outputs the generated driving signals to the TOSA 112. The TOSA 112 generates a transmission optical signal TxS from light of laser diodes driven in accordance with the driving signals. The TOSA 112 modulates four lights with different peak wavelengths in accordance with the driving signals for the individual lanes and wavelength-multiplexes the four lights by using an optical coupler or an optical multiplexer, so that a transmission optical signal TxS is generated as a wavelength multiplex optical signal. The transmission optical signal TxS is transmitted from the TOSA 112 through a transmission path such as an optical fiber to an apparatus with which the transmission apparatus 2a or the transmission apparatus 2b on which the optical transceiver 1 is mounted communicates.

Furthermore, a reception optical signal RxS, which is a wavelength multiplex optical signal from an apparatus with which the optical transceiver 1 communicates is input through a transmission path to the optical transceiver 1. The ROSA 122 splits, using an optical splitter or an optical demultiplexer, the reception optical signal RxS into four lights with different peak wavelengths and converts the individual lights into electrical signals by suing a photo diode, so that four current signals are generated. The ROSA 122 outputs the current signals to four lanes. The four current signals generated by the ROSA 122 are transmitted in parallel over the four lanes and input to the TIA 121. The TIA 121 converts the current signals on the four lanes generated by the ROSA 122 into voltage signals and outputs the voltage signals to the CDR circuit 120. The TIA 121 may be built in the ROSA 122, and the ROSA 122 may output the voltage signals for the four lanes to the CDR circuit 120.

The CDR circuit 120 regenerates clock signals from the signals on the four lanes output from the TIA 121 and regenerates timings. The CDR circuit 120 has a configuration similar to that of the CDR circuit 110. The CDR circuit 120 does not output a LOS signal but outputs a LOL signal RxLOL. As with the CDR circuit 110, the CDR circuit 120 sets the frequencies of oscillators inside the CDR circuit 120 and types of input signals on the basis of transmission rate set values.

The microcontroller 10 receives various monitor signals from the transmission circuit 11 and the reception circuit 12. The monitor signals include, for example, power of a transmission optical signal, a bias value of the transmission optical signal, and power of a reception optical signal RxS. The microcontroller 10 monitors the state of the transmission circuit 11 and the reception circuit 12 in accordance with the monitor signals, controls the transmission circuit 11 and the reception circuit 12 in accordance with results of monitoring, and outputs an alarm or warning to the host controller 20a or the host controller 20b to which the microcontroller 10 is connected.

Furthermore, the microcontroller 10 is connected to the CDR circuits 110 and 120, the LDD circuit 111, and the TIA 121, for example, through the SPI bus SPI. The microcontroller 10 sets a configuration corresponding to the transmission apparatus 2a (100 G configuration) or a configuration corresponding to the transmission apparatus 2b (200 G configuration) for the CDR circuits 110 and 120, the LDD circuit 111, and the TIA 121 through the bus SPI.

For example, for the 100 G configuration, the microcontroller 10 sets the transmission rate set values for the CDR circuit 110 to the values of the transmission rates corresponding to the NRZ signals TxDATAa1 to TxDATAa4. The control circuit 110d of the CDR circuit 110 sets, in accordance with the set transmission rate set values, the set frequencies of the timing recovery circuits 110g1 to 110g4 to values of frequencies that match the NRZ signals TxDATAa1 to TxDATAa4 corresponding to the transmission data signal TxDATAa. In the case where the set frequencies of the timing recovery circuits 110g1 to 110g4 are set to frequencies that match the NRZ signals TxDATAa1 to TxDATAa4, the CDR circuit 110 is able to regenerate clock signals from the NRZ signals TxDATAa1 to TxDATAa4. In contrast, in the case where the set frequencies of the timing recovery circuits 110g1 to 110g4 are set to frequencies that match the NRZ signals TxDATAa1 to TxDATAa4, the CDR circuit 110 does not regenerate clock signals from the PAM4 signals TxDATAb1 to TxDATAb4.

For example, for the 200 G configuration, the microcontroller 10 sets the transmission rate set values for the CDR circuit 110 to the same values as the values of the transmission rates of the PAM4 signals TxDATAb1 to TxDATAb4. The control circuit 110d of the CDR circuit 110 sets the set frequencies of the timing recovery circuits 110g1 to 110g4 to frequencies that match the PAM4 signals TxDATAb1 to TxDATAb4 corresponding to the transmission data signal TxDATAb. In the case where the set frequencies of the timing recovery circuits 110g1 to 110g4 are set to frequencies that match the PAM4 signals TxDATAb1 to TxDATAb4, the CDR circuit 110 is able to regenerate clock signals from the PAM4 signals TxDATAb1 to TxDATAb4. In contrast, in the case where the set frequencies of the timing recovery circuits 110g1 to 110g4 are set to frequencies that match the PAM4 signals TxDATAb1 to TxDATAb4, the CDR circuit 110 does not regenerate clock signals from the NRZ signals TxDATAa1 to TxDATAa4.

Regarding setting for the timing recovery circuits 110g1 to 110g4, types of signals (for example, NRZ, PAM4, etc.) may further be set. In this case, in the case where a signal of a type different from a set type is input, a clock signal is not regenerated.

Furthermore, the microcontroller 10 performs control regarding transmission processing of the transmission circuit 11 and reception processing of the reception circuit 12 through the bus SPI.

Furthermore, the microcontroller 10 receives a LOS signal TxLOS and a LOL signal TxLOL from the CDR circuit 110.

The LOS signal TxLOS is a signal for notifying the microcontroller 10 of whether or not a transmission data signal TxDATAa or a transmission data signal TxDATAb is input to the optical transceiver 1 from the transmission apparatus 2a or the transmission apparatus 2b on which the optical transceiver 1 is mounted.

The LOL signal TxLOL is a signal for notifying the microcontroller 10 of whether a clock signal is regenerated or not regenerated from a transmission data signal TxDATAa or a transmission data signal TxDATAb input from the transmission apparatus 2a or the transmission apparatus 2b on which the optical transceiver 1 is mounted.

The microcontroller 10 determines, on the basis of the LOL signal TxLOL, whether the CDR circuit 110 regenerates or does not regenerate a clock signal. Thus, the microcontroller 10 is able to be notified of regeneration or non-regeneration of a clock signal at an appropriate timing from the CDR circuit 110.

A reset signal ResetL is input to the microcontroller 10 from the host controller 20a of the transmission apparatus 2a or the host controller 20b of the transmission apparatus 2b on which the optical transceiver 1 is mounted. In the case where the LOL signal TxLOL is at Low level when the reset signal ResetL is input to the microcontroller 10, the microcontroller 10 determines that a clock signal is not regenerated. The microcontroller 10 sets priority level such that a program corresponding to another one of the transmission apparatus 2a and the transmission apparatus 2b is executed by booting up, and executes a boot program described below.

As described above, a program to be executed after reset is changed. Thus, the operation configuration of the transmission circuit 11 and the reception circuit 12 is switched to 100 G configuration or 200 G configuration in accordance with the transmission rate of the transmission apparatus 2a or the transmission apparatus 2b on which the optical transceiver 1 is mounted. At this time, the microcontroller 10 outputs the reset signal TxRST tot eh CDR circuit 110, and thus restarts the CDR circuit 110. Accordingly, after configuration is switched, the CDR circuit 110 operates with an operation configuration corresponding to the transmission rate set values.

Furthermore, the microcontroller 10 outputs a light emission stop signal TxDIS to the LDD circuit 111 in accordance with an alarm or warning. When receiving the light emission stop signal TxDIS, the LDD circuit 111 stops optical output from the TOSA 112. Accordingly, abnormal transmission of a transmission optical signal TxS is prevented.

The TIA 121 outputs a LOS signal RxLOS, which indicates whether or not a reception optical signal RxS is input to the ROSA 122 and, for example, an electrical signal is output to the TIA 121, to the microcontroller 10. Accordingly, the microcontroller 10 is able to detect that optical input from an apparatus with which the transmission apparatus 2a or the transmission apparatus 2b on which the optical transceiver 1 is mounted communicates is blocked, that is, loss of a signal.

Furthermore, the microcontroller 10 receives a LOL signal RxLOL from the CDR circuit 120. The LOL signal RxLOL notifies the microcontroller 10 of regeneration or non-regeneration of a clock signal from a reception data signal RxDATAa or a reception data signal RxDATAb input from the TIA 121. The LOL signal RxLOL notifies whether or not clock signals have been regenerated from the NRZ signals RxDATAa1 to RxDATAa4 of a reception data signal RxDATAa or the PAM4 signals RxDATAb1 to RxDATAb4 of a reception data signal RxDATAb. Accordingly, the microcontroller 10 is able to detect abnormality of reception of light from an apparatus with which the transmission apparatus 2a or the transmission apparatus 2b communicates.

Prior to booting up, the microcontroller 10 outputs a reset signal RxRST to the CDR circuit 120. Accordingly, after reset is performed, the CDR circuit 120 operates with an operation configuration based on a program with high priority.

Configuration of Connector 17

The optical transceiver 1 is detachable from any of the transmission apparatus 2a and the transmission apparatus 2b through the connector 17. The connector 23a of the transmission apparatus 2a and the connector 23b of the transmission apparatus 2b have different shapes. The connector 17 of the optical transceiver 1 has a shape that is able to be connected to any of the connector 23a and the connector 23b.

Figure 2:
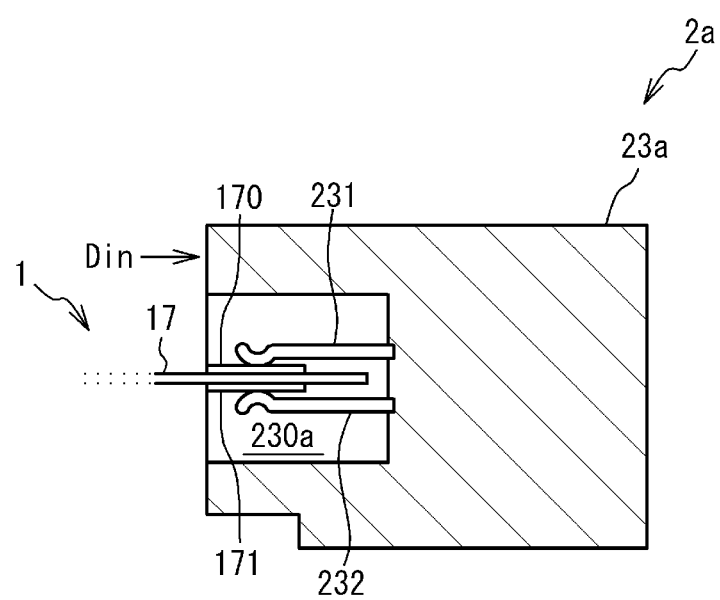
FIG. 2 is a sectional view illustrating an example of a connector of a transmission apparatus with a transmission rate of 100 Gbps.

FIG. 2 is a sectional view illustrating an example of the connector 23a of the transmission apparatus 2a that transmits and receives an electrical signal at a transmission rate of 100 Gbps. In FIG. 2, a state in which the connector 17 of the optical transceiver 1 is connected to the connector 23a of the transmission apparatus 2a is illustrated.

The connector 17 of the optical transceiver 1 is inserted in an inserting direction Din into an insertion hole 230a of a cage provided at the connector 23a of the transmission apparatus 2a. The connector 17 has a plate shape. Based on QSFP28, pads (electrical terminals) 170 and 171 are provided on faces of the connector 17. The pads 170 and 171 are arranged in a direction orthogonal to the inserting direction Din and arranged overlapping each other when a plate face of the connector 17 is viewed from the front.

The pads 170 and 171 are in contact with plate-spring electrical terminals 231 and 232, respectively, that are provided inside the insertion hole 230a. The electrical terminals 231 and 232 are arranged in a direction orthogonal to the inserting direction Din and are in contact with the pads 170 and 171, respectively, such that the electrical terminals 231 and 232 vertically sandwich the pads 170 and 171. Accordingly, the connector 17 and the connector 23a are electrically connected to each other.

Figure 3:
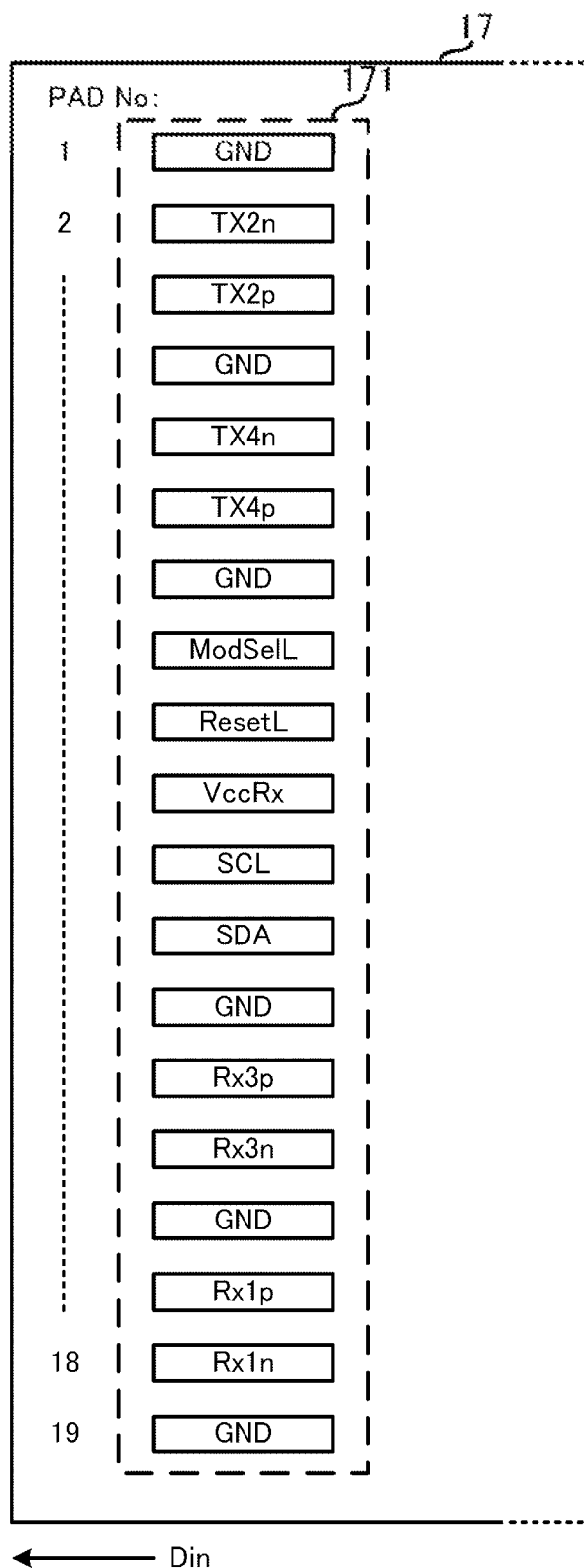
FIG. 3 is a diagram illustrating an example of signal allocation for a pad on one face of a connector of an optical transceiver.
Figure 4:
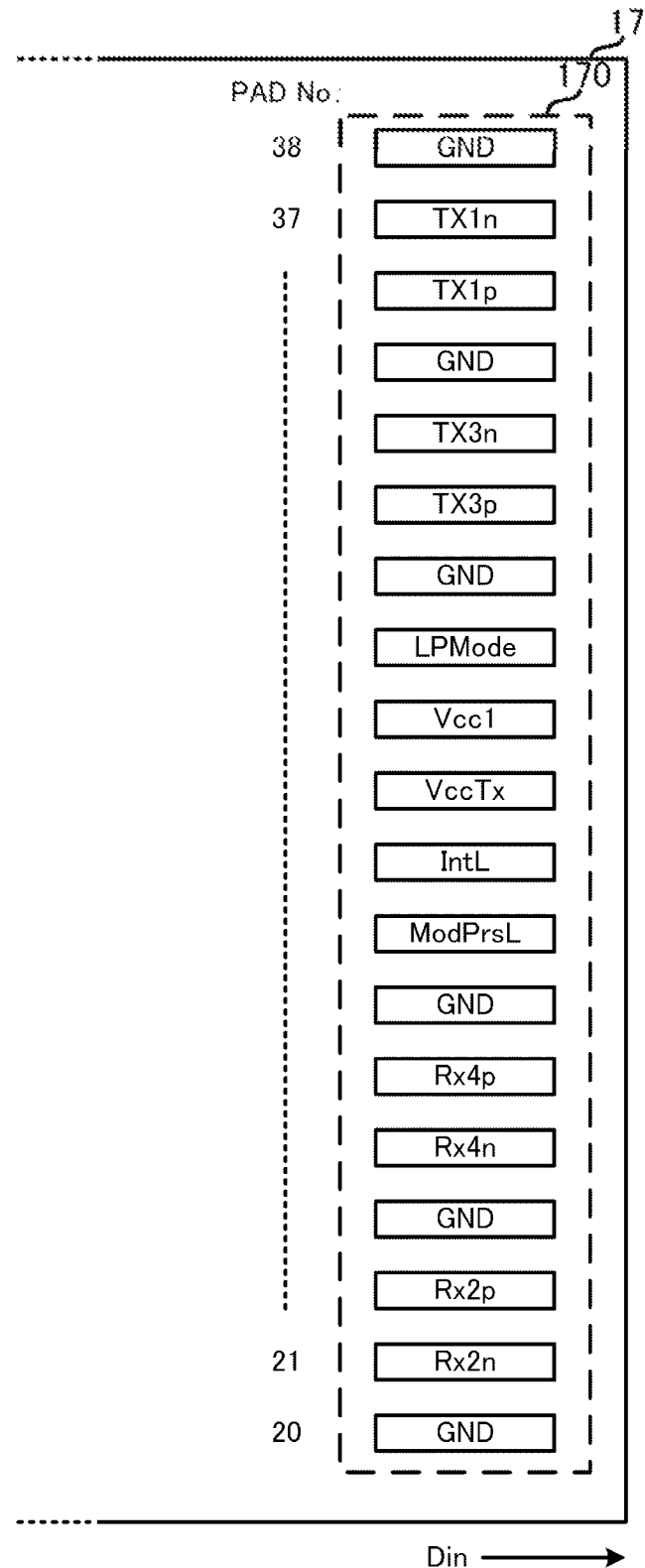
FIG. 4 is a diagram illustrating an example of signal allocation for a pad on the other face of the connector of the optical transceiver.

FIG. 3 is a diagram illustrating an example of signal allocation for the pad 171 on one face of the connector 17 of the optical transceiver 1. FIG. 4 is a diagram illustrating an example of signal allocation for the pad 170 on the other face of the connector 17 of the optical transceiver 1. In FIGS. 3 and 4, arrangements of the pads 170 and 171 when the plate faces of the connector 17 are viewed from the front are illustrated.

In these examples, pad arrangement and signal allocation for QSFP28 defined by MSA standards are provided. For QSFP28, for example, the pads 170 and 171 are arranged to be aligned on the individual faces.

Pad elements No. 1 to No. 19 of the pad 171 are aligned on one face of the connector 17. As described above, for example, a reset signal ResetL is used for interrupt request for the microcontroller 10. Signals SCL and SDA are used for communication of the I2C between the microcontroller 10 and the host controller 20a. Furthermore, signals Tx2n, Tx2p, Tx4n, and Tx4p correspond to a transmission data signal TxDATAa or a transmission data signal TxDATAb, and signals Rx3n, Rx3p, Rx1n, and Rx1p correspond to a reception data signal RxDATAa or a reception data signal RxDATAb. A signal ModSelL is used for selection of a module. A signal GND is a ground signal.

Pad elements No. 20 to No. 38 of the pad 170 are aligned on the other face of the connector 17. As described above, for example, an alarm signal IntL is used for notifying the host controller 20a of abnormality of the optical transceiver 1, and a mode signal LPMode is used for operating the optical transceiver 1 in a low power consumption mode. Signals Tx1n, Tx1p, Tx3n, and Tx3p correspond to a transmission data signal TxDATAa or a transmission data signal TxDATAb, and signals Rx2n, Rx2p, Rx4n, and Rx4p correspond to a reception data signal RxDATAa or a reception data signal RxDATAb. A signal ModPrsL is a signal indicating whether or not the optical transceiver 1 is connected to the inside of a cage of a transmission apparatus.

As described above, the connector 17 has a form in which pad elements are arranged in a line on the basis of QSFP28. However, the connector 17 may also be connected to the connector 23b of the transmission apparatus 2b, which corresponds to a form in which pad elements are arranged in two lines.

Figure 5:
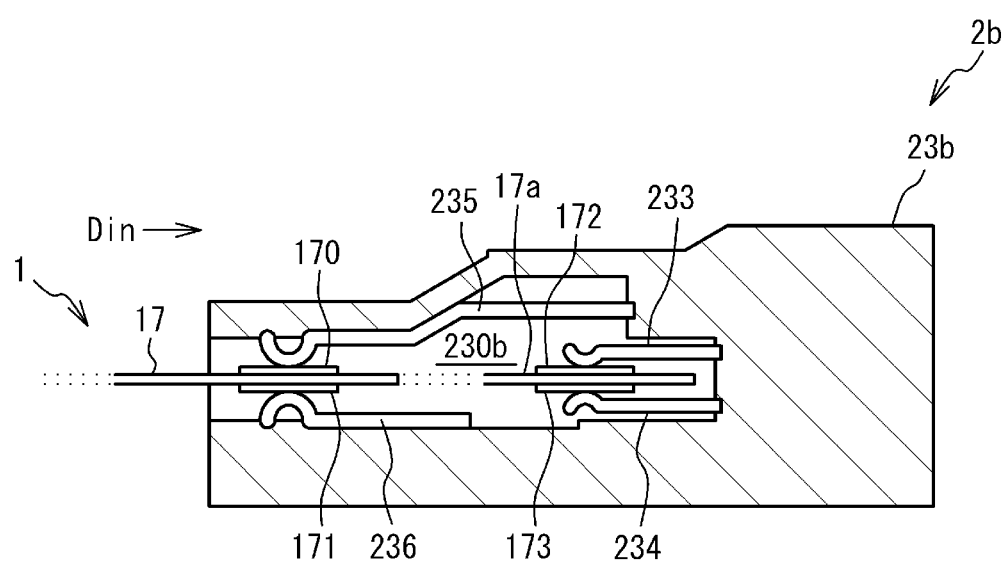
FIG. 5 is a sectional view illustrating an example of a connector of a transmission apparatus with a transmission rate of 200 Gbps.

FIG. 5 is a sectional view illustrating an example of the connector 23b of the transmission apparatus 2b that transmits and receives an electrical signal at a transmission rate of 200 Gbps. In FIG. 5, a state in which the connector 17 of the optical transceiver 1 is connected to the connector 23b of the transmission apparatus 2b is illustrated.

The connector 23b of the transmission apparatus 2b includes terminals arranged on the basis of QSFP-DD defined by MSA standards. The connector 17 of the optical transceiver 1 is inserted in the inserting direction Din into an insertion hole 230b provided at the connector 23b of the transmission apparatus 2b. The insertion hole 230b is deeper than the insertion hole 230a of the connector 23a mentioned above. Plate-spring terminals 235 and 236 are provided on an entrance side in the insertion hole 230b, and plate-spring terminals 233 and 234 are provided on a back side in the insertion hole 230b. That is, the connector 23b of the transmission apparatus 2b has a form in which terminal elements are arranged in two lines, unlike the connector 23a of the transmission apparatus 2a.

The connector 17 of the optical transceiver 1 has the form in which pad elements are arranged in one line. Therefore, the connector 17 of the optical transceiver 1 is in contact with only the terminals 235 and 236 arranged on the entrance side of the connector 23b. The terminals 235 and 236 are arranged in a direction orthogonal to the inserting direction Din and are in contact with the pads 170 and 171, respectively, such that the terminals 235 and 236 vertically sandwich the pads 170 and 171. Accordingly, the connector 17 and the connector 23b are electrically connected to each other.

In FIG. 5, a connector 17a of another optical transceiver that has a form in which pad elements are arranged in two lines on the basis of QSFP-DD is also illustrated. The connector 17a further includes pads 172 and 173, compared to the connector 17 based on QSFP28 mentioned above. The pads 172 and 173 are provided on faces on a front end side of the plate-shape connector 17a and are in contact with the terminals 233 and 234 of the transmission apparatus 2b such that the pads 172 and 173 are sandwiched between the terminals 233 and 234 of the transmission apparatus 2b. Furthermore, the pads 170 and 171 are provided on faces on a rear end of the connector 17a and are in contact with the terminals 235 and 236 of the transmission apparatus 2b such that the pads 170 and 171 are sandwiched between the terminals 235 and 236, in a manner similar to the pads 170 and 171 of the connector 17.

Figure 6:
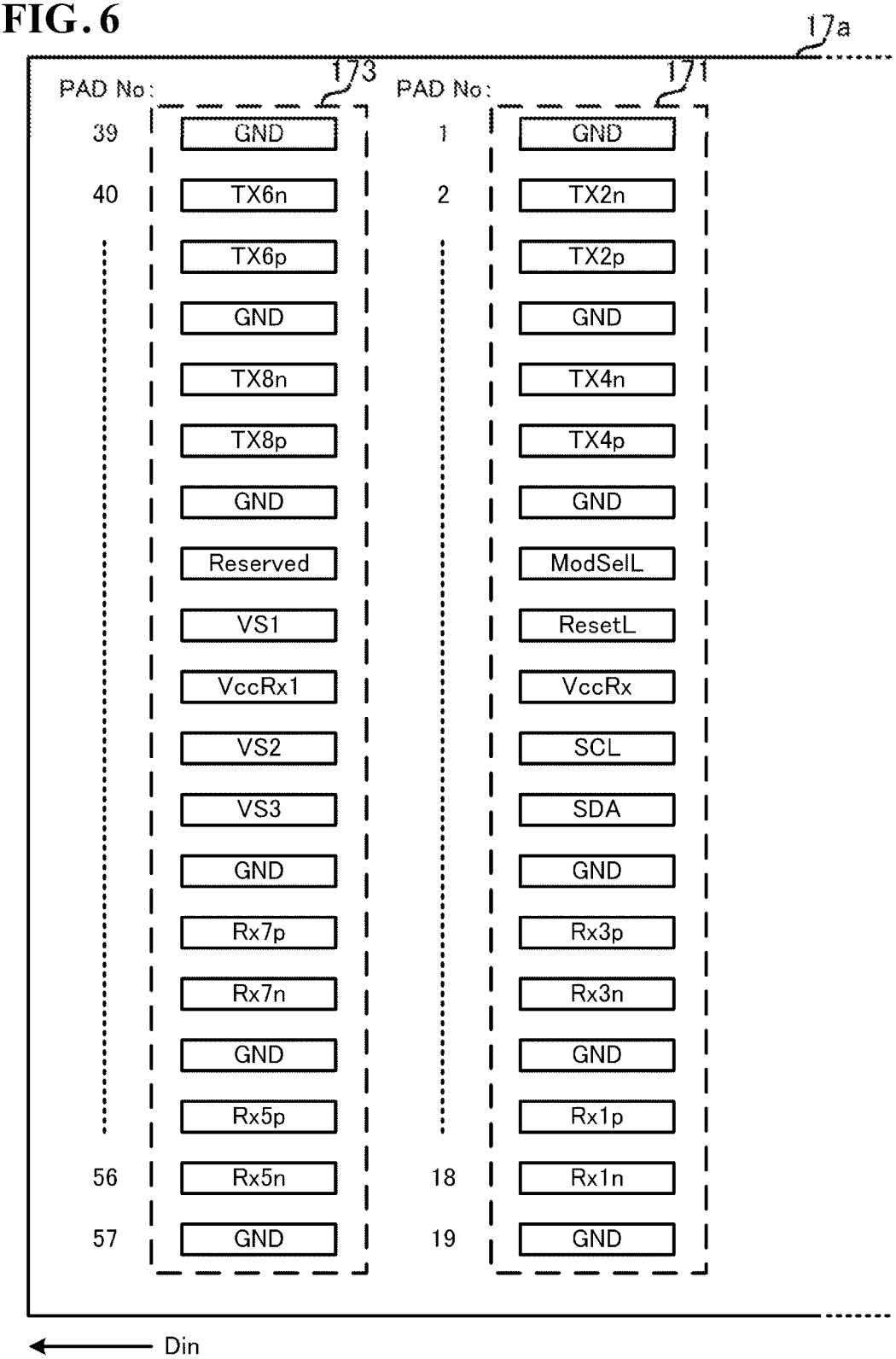
FIG. 6 is a diagram illustrating an example of signal allocation for a pad on one face of a connector of an optical transceiver complying with QSFP-DD.
Figure 7:
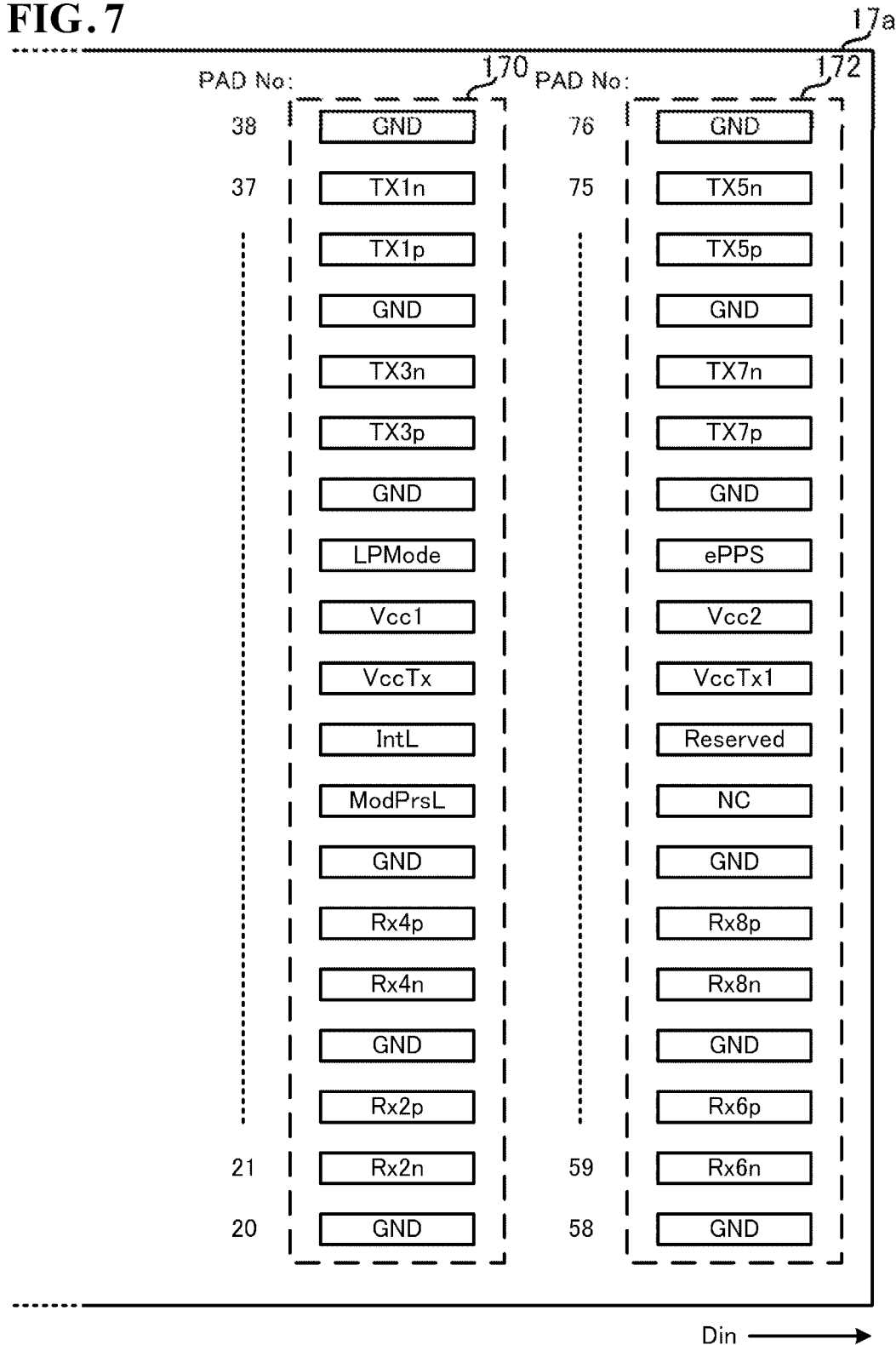
FIG. 7 is a diagram illustrating an example of signal allocation for a pad on the other face of the connector of the optical transceiver complying with QSFP-DD.

FIG. 6 is a diagram illustrating an example of signal allocation for the pads 171 and 173 on one face of the connector 17a of the optical transceiver complying with QSFP-DD. FIG. 7 is a diagram illustrating an example of signal allocation for the pads 170 and 172 on the other face of the connector 17a of the optical transceiver complying with QSFP-DD. In FIGS. 6 and 7, arrangements of the pads 170 to 173 when the plate faces of the connector 17a are viewed from the front are illustrated.

The connector 17a has a form in which pad elements are arranged in two lines on the basis of QSFP-DD. Pad elements No. 1 to No. 19 of the pad 171 and pad elements No. 39 to No. 57 of the pad 173 are aligned in parallel on one face of the connector 17a.

Signal allocation for the pads 170 and 171 is similar to that for the pads 170 and 171 of the connector 17 based on QSFP28. Therefore, the connector 17 is able to be connected to the connector 23b of the transmission apparatus 2b as well as to the connector 23a of the transmission apparatus 2a. For example, in the case where the optical transceiver 1 complies with QSFP28 and the transmission apparatus 2a is a transmission apparatus for QSFP28, the connector 17 of the optical transceiver 1 is engaged with the connector 23a of the transmission apparatus 2a, as illustrated in FIG. 2. In the case where the optical transceiver 1 complies with QSFP28 and the transmission apparatus 2b is a transmission apparatus for QSFP-DD, the connector 17 of the optical transceiver 1 is engaged with the terminals 235 and 236 on the entrance side of the connector 23b of the transmission apparatus 2b (the terminals 233 and 234 on the back side are open). In either case, predetermined terminals of the pads 170 and 171 are electrically connected to the transmission apparatus 2a or the transmission apparatus 2b in accordance with arrangement.

The optical transceiver 1 includes a program corresponding to the transmission apparatus 2a (program with 100 G configuration) and a program corresponding to the transmission apparatus 2b (program with 200 G configuration) separately as firmware, that is, as programs defining the operation of a processor of the microcontroller 10.

Memory Map of Program

Figure 8:
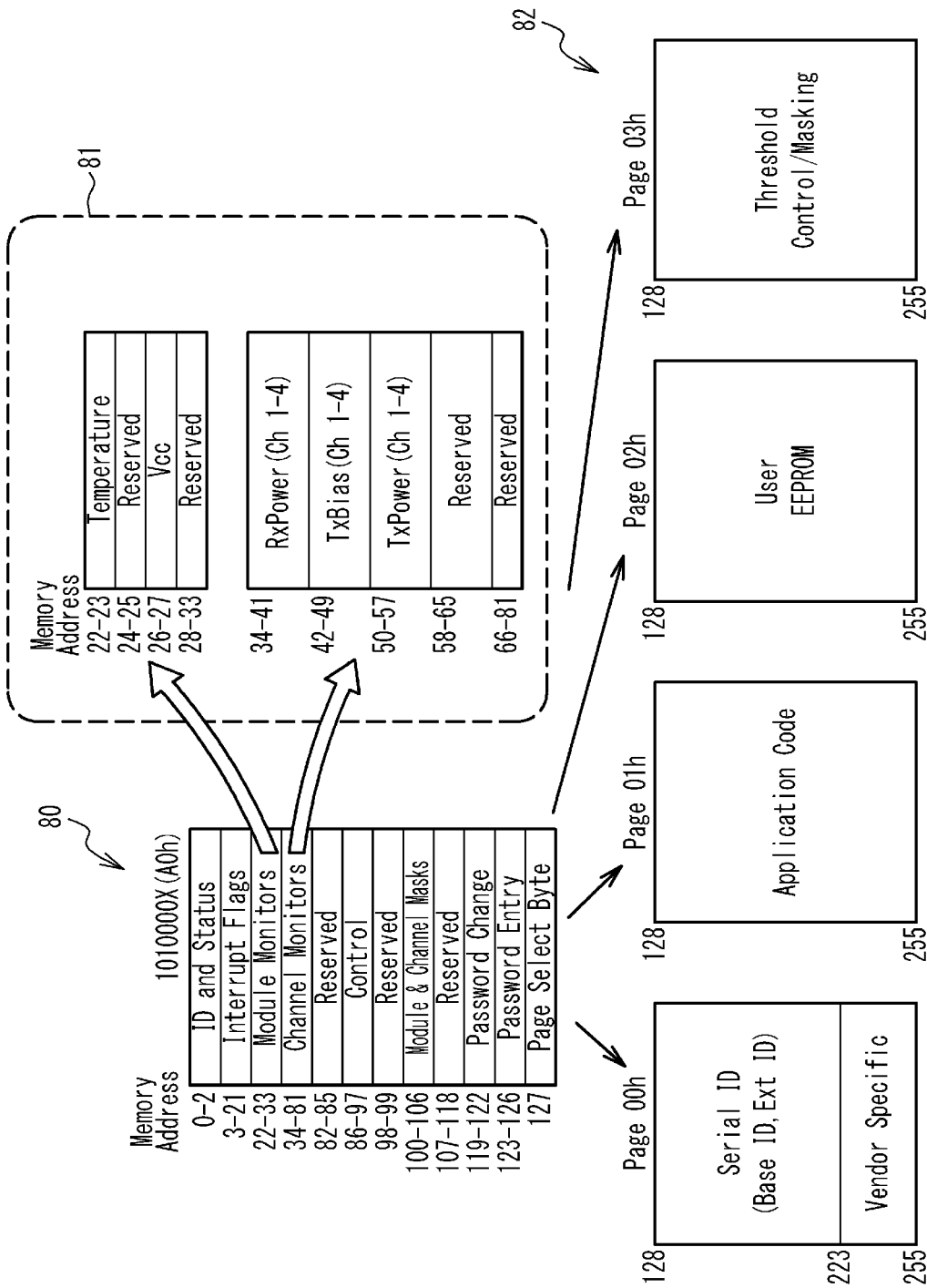
FIG. 8 is a diagram illustrating an example of a memory map of an I2C bus for a program with 100 G configuration.

FIG. 8 is a diagram illustrating an example of a memory map 80 of the I2C bus for the program with 100 G configuration. The memory map 80 complies with SFF-8636 and is used for communication processing with the host controller 20a by the I2C.

Reference sign 81 represents a map of regions of "Module Monitors" and "Channel Monitors" of the memory map 80. "Module Monitors" and "Channel Monitors" are used for monitoring the temperature inside the optical transceiver 1, a transmission data signal TxDATAa or a transmission data signal TxDATAb, and a reception data signal RxDATAa or a reception data signal RxDATAb.

A password for writing, for example, information necessary for correction of a main signal to an electrically erasable read-only memory (EEPROM) (see FIG. 10) inside the microcontroller 10 is written into a "Password Entry" region inside the memory map 80. Selection information on a page of the memory is written into a "Page Select Byte" region inside the memory map 80. As indicated by reference sign 82, access to registers "Page 00h" to "Page 03h" is enabled in accordance with selection information in the "Page Select Byte" region. For example, when "Page 02h" is selected, access to the EEPROM is enabled.

Figure 9:
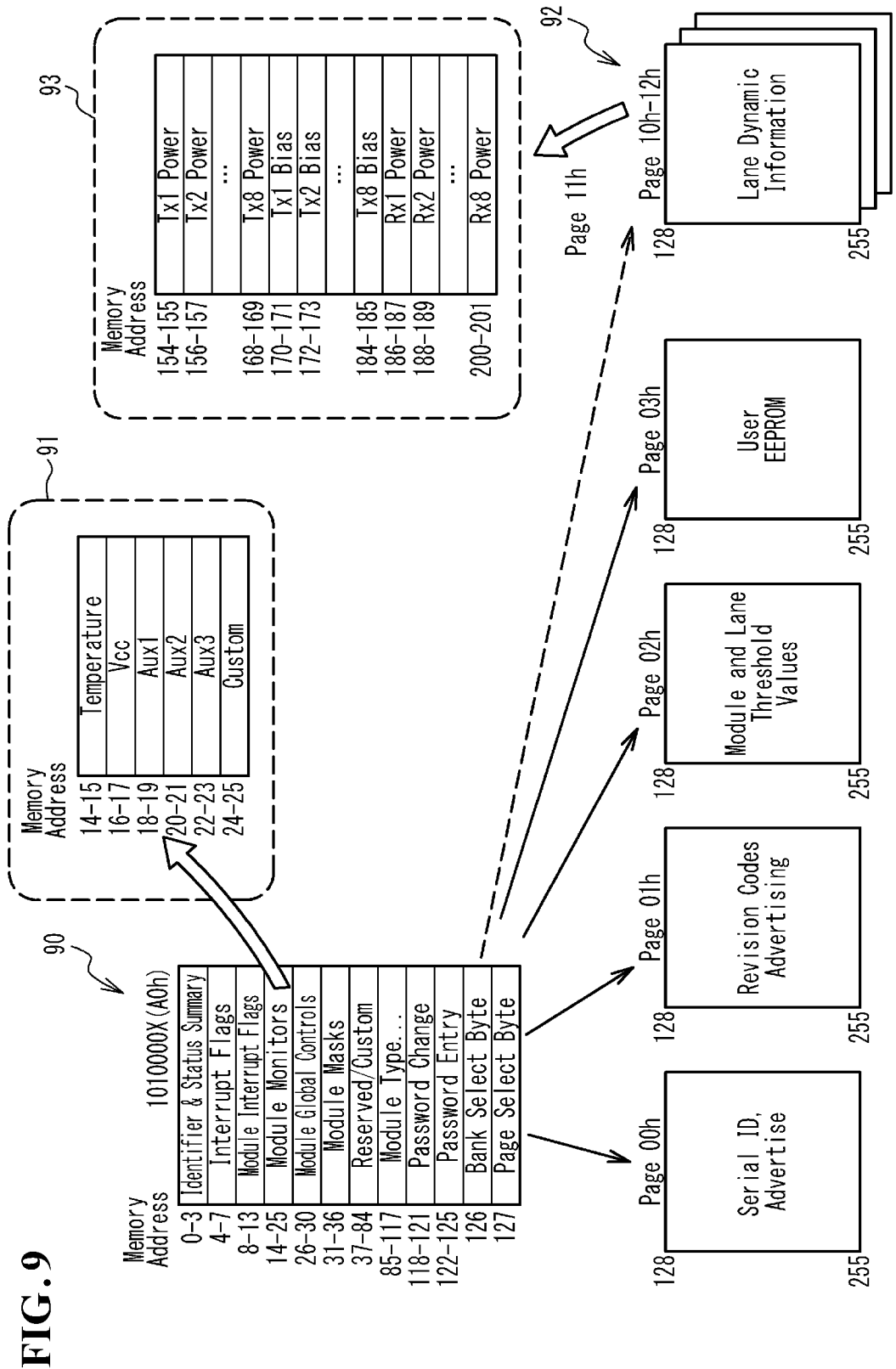
FIG. 9 is a diagram illustrating an example of a memory map of an I2C bus for a program with 200 G configuration.

FIG. 9 is a diagram illustrating an example of a memory map 90 of the I2C bus for the program with 200 G configuration. The memory map 90 complies with CMIS and is used for communication processing with the host controller 20b by the I2C.

Reference sign 91 represents a map of a "Module Monitors" region of the memory map 90. The "Module Monitors" region of the memory map 90 corresponds to the "Module Monitors" of the memory map 80, and a "Password Entry" region of the memory map 90 corresponds to the "Password Entry" region of the memory map 90.

Furthermore, a "Page Select Byte" region inside the memory map 90 corresponds to the "Page Select Byte" region inside the memory map 80. As indicated by reference sign 92, access to registers "Page 00h" to "Page 12h" is enabled in accordance with selection information in the "Page Select Byte" region. For example, when "Page 03h" is selected, access to an EEPROM is enabled. Furthermore, reference sign 93 represents a map of a "Lane Dynamic Information" region of "Page 11h". The "Lane Dynamic Information" region corresponds to the "Channel Monitors" region of the memory map 80.

As described above, the memory maps of the I2C buses for the program with 100 G configuration and the program with 200 G configuration have common contents. However, management interface specifications with which the program with 100 G configuration and the program with 200 G configuration comply are different (SFF-8636 and CMIS), and register configurations and address allocations are different between the programs. For example, the address of the "Password Entry" region inside the memory map 80 is "123-126", whereas the address of the "Password Entry" region inside the memory map 90 is "122-125". Furthermore, pages of the EEPROM that can be selected by the "Page Select Byte" region inside the memory map 80 are "Page 00h" to "Page 03h", whereas pages of the EEPROM that can be selected by the "Page Select Byte" region inside the memory map 90 are "Page 00h" to "Page 12h".

Thus, the host controller 20a or the host controller 20b is not able to perform change of settings and the like through communication by the bus I2C in the case where the optical transceiver 1 does not operate in accordance with a corresponding program. Furthermore, in the case where the transmission apparatus 2a or the transmission apparatus 2b on which the optical transceiver 1 is mounted is switched, a user may cause the microcontroller 10 corresponding to the transmission apparatus 2a or the transmission apparatus 2b on which the optical transceiver 1 is mounted to download an appropriate program and rewrite a program for the optical transceiver 1. However, the user needs to spend time and effort for a download operation and the like.

The microcontroller 10 determines, on the basis of a LOL signal TxLOL, whether or not the transmission rate of the transmission apparatus 2a or the transmission apparatus 2b on which the optical transceiver 1 is mounted is equal to a transmission rate set value. In the case where the transmission rate of the transmission apparatus 2a or the transmission apparatus 2b on which the optical transceiver 1 is mounted is not equal to the transmission rate set value, the microcontroller 10 sets the priority level of one of the program with 100 G configuration and the program with 200

G configuration that is being executed to be lower than the priority level of the other one of the program with 100 G configuration and the program with 200 G configuration that is not being executed and then performs booting up.

Configuration of Microcontroller 10

Figure 10:
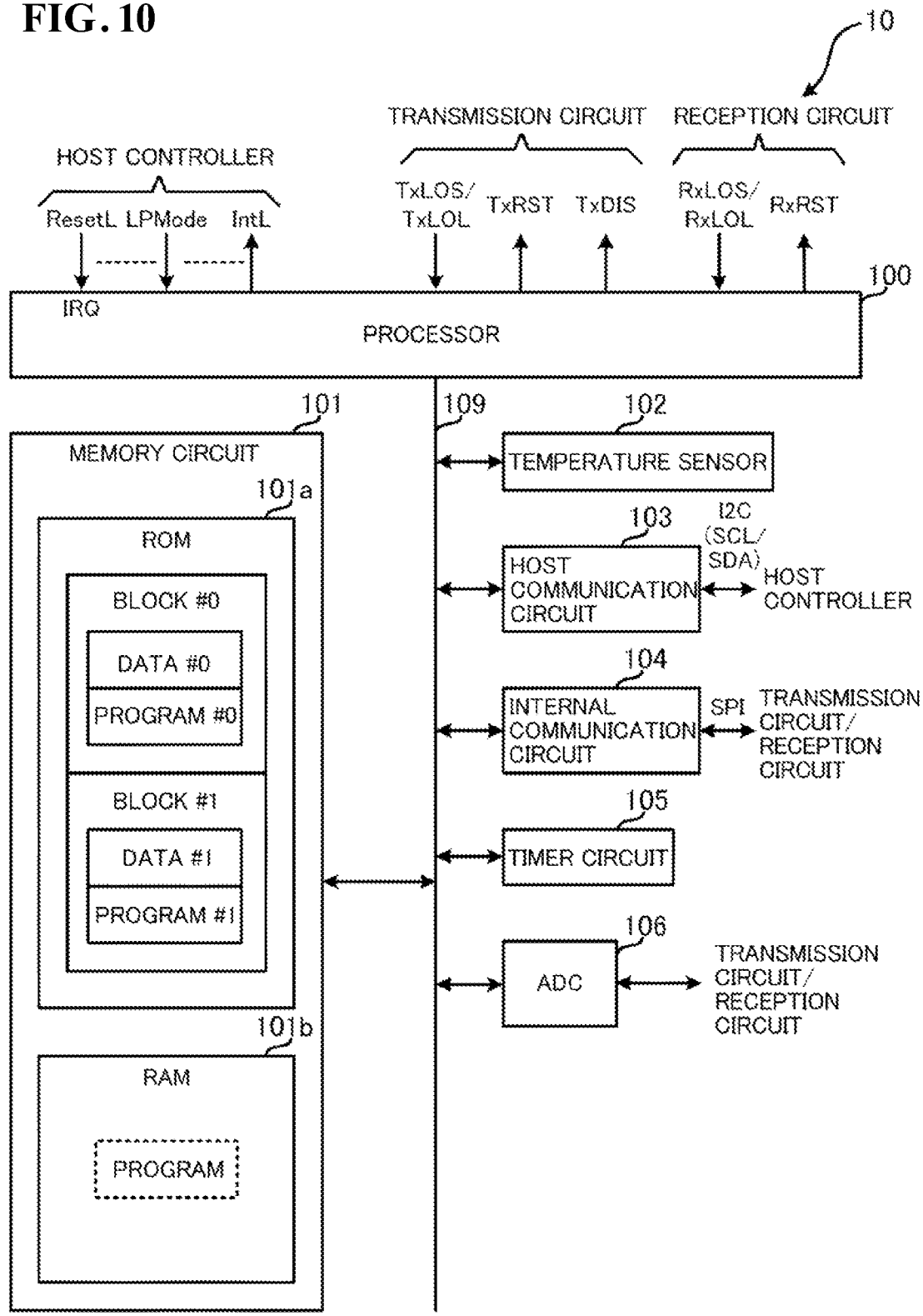
FIG. 10 is a configuration diagram illustrating an example of a microcontroller.

FIG. 10 is a configuration diagram illustrating an example of the microcontroller 10. The microcontroller 10 includes a processor 100 such as a central processing unit (CPU), a memory circuit 101, a temperature sensor 102, a host communication circuit 103, an internal communication circuit 104, a timer circuit 105, and an analog-to-digital converter (ADC) 106. The processor 100 transmits and receives data via the memory circuit 101, the temperature sensor 102, the host communication circuit 103, the internal communication circuit 104, the timer circuit 105, the ADC 106, and a bus 109.

The processor 100 controls the entire optical transceiver 1 according to this embodiment. The processor 100 includes an input port and an output port for inputting and outputting various signals. A reset signal ResetL and a mode signal LPMode are input to the processor 100 through the connector 17 from the host controller 20a or the host controller 20b to which the microcontroller 10 is connected. The reset signal ResetL is input to the IRQ port for interrupt request of the processor 100.

During execution of the program with 100 G configuration or the program with 200 G configuration, the processor 100 recognizes the reset signal ResetL as interrupt request, and performs an interrupt process. During execution of the interrupt process, the processor 100 sets the priority level of the program that is being executed to be lower than the priority level of a program that is not being executed, in accordance with regeneration or non-regeneration of a clock signal at the CDR circuit 110.

Furthermore, the processor 100 outputs an alarm signal IntL to the host controller 20a or the host controller 20b (see FIG. 1A or FIG. 1B) connected to the microcontroller 10 through the connector 17. The processor 100 also transmits or receives a LOS signal TxLOS, a LOL signal TxLOL, a reset signal TxRST, and a light emission stop signal TxDIS to and from the transmission circuit 11. The processor 100 also transmits or receives a LOS signal RxLOS, a LOL signal RxLOL, and a reset signal RxRST to and from the reception circuit 12.

The temperature sensor 102 detects the temperature of the optical transceiver 1. The processor 100 acquires the temperature from the temperature sensor 102 through the bus 109, and controls the transmission circuit 11 and the reception circuit 12 in accordance with the temperature.

The host communication circuit 103 processes communication through the bus I2C with the host controller 20a or the host controller 20b to which the microcontroller 10 is connected. A signal SCL and a signal SDA are used for communication through the bus I2C. The processor 100 transmits and receives a message to and from the host controller 20a or the host controller 20b to which the microcontroller 10 is connected, through the bus 109 and the host communication circuit 103.

The internal communication circuit 104 processes communication through the bus SPI with the CDR circuits 110 and 120, the LDD circuit 111, and the TIA 121. The processor 100 transmits and receives data to and from the CDR circuits 110 and 120, the LDD circuit 111, and the TIA 121 through the bus 109 and the internal communication circuit 104. For example, the processor 100 sets 100 G configuration or 200 G configuration for the CDR circuits 110 and 120, the LDD circuit 111, and the TIA 121 through the bus SPI. The internal communication circuit 104 may process communication through the bus I2C instead of the bus SPI.

The timer circuit 105 counts time by a counter. The processor 100 acquires time from the timer circuit 105 through the bus 109 and manages execution of, for example, periodical processing.

The ADC 106 converts a monitor signal, which is input as an analog signal from the transmission circuit 11 and the reception circuit 12, into a digital signal. The processor 100 acquires the monitor signal from the ADC 106 through the bus 109.

The memory circuit 101 includes a ROM 101a and a random access memory (RAM) 101b. The processor 100 accesses the ROM 101a and the RAM 101b through the bus 109.

A memory region of two-side configuration including block #0 and a block #1 is provided in the ROM 101a. The processor 100 is able to access each of the block #0 and the block #1. Data #0 and program #0 with 100 G configuration are stored in the block #0. Data #1 and program #1 with 200 G configuration are stored in the block #1. The ROM 101a includes a rewritable non-volatile memory such as a flash ROM, an EEPROM, or the like.

At the time of booting the processor 100, the program #0 or the program #1 that is to be executed is loaded to the RAM 101b in accordance with a keycode indicating the priority level of the program, which will be described later. In the boot process, the processor 100 selects one of the program #0 and the program #1 as the program to be executed, and loads the selected program to the RAM 101b.

Memory Map of ROM 101a

Figure 11:
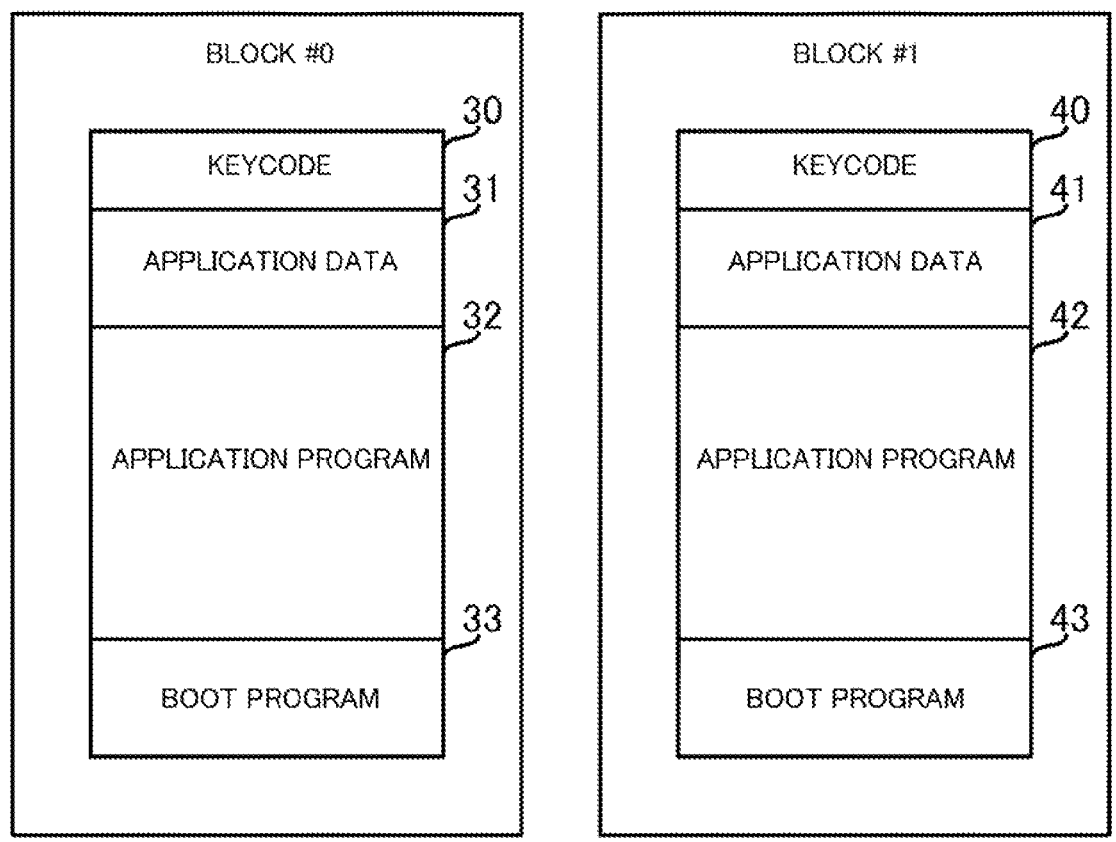
FIG. 11 is a diagram illustrating an example of a memory map of a read only memory (ROM).

FIG. 11 is a diagram illustrating an example of a memory map of the ROM 101a. A keycode 30, application data 31, an application program 32, and a boot program 33 are stored in the block #0. The application data 31 and the application program 32 correspond to the data #0 and the program #0, respectively.

A keycode 40, application data 41, an application program 42, and a boot program 43 are stored in the block #1. The application data 41 and the application program 42 correspond to the data #1 and the program #1, respectively.

When the priority level of the program #0 is higher than the priority level of the program #1, after booting up, the microcontroller 10 executes the application program 32 and sets 100 G configuration for the transmission circuit 11 and the reception circuit 12. As the value of a transmission rate for a transmission apparatus for QSFP28, the application data 31 includes 100 Gbps. After the microcontroller 10 boots and the application program 32 is loaded, the CDR circuit 110 is set such that clock signals are regenerated from NRZ signals TxDATAa1 to TxDATAa4 of a transmission data signal TxDATAa. Specifically, the value of the transmission rate of the NRZ signal included in the application data 31 described later, which is 100 Gbps, is set as the transmission rate set value for the CDR circuit 110.

Furthermore, as described above with reference to FIG. 8, the application program 32 executes monitoring and control of the optical transceiver 1 in accordance with the SFF-8636 specification. SFF-8636 is an example of a first specification.

The application data 31 is data used during execution of the application program 32. The application data 31 includes a transceiver code for 100 G configuration, a threshold for alarm detection, a parameter for monitor conversion, various set values for transmitting and receiving NRZ signals TxDATAa1 to TxDATAa4, and the like. The various set values for transmitting and receiving the NRZ signals TxDATAa1 to TxDATAa4 include values of transmission rate for the NRZ signals TxDATAa1 to TxDATAa4 (first transmission rate) set for the CDR circuit 110. The application data 31 and the application program 32 are an example of the first program.

When the priority level of the program #1 is higher than the priority level of the program #0, after booting up, the microcontroller 10 executes the application program 42 and sets 200 G configuration for the transmission circuit 11 and the reception circuit 12. As the value of a transmission rate for a transmission apparatus for QSFP-DD, the application data 41 includes 200 Gbps. After the microcontroller 10 boots and the application program 42 is loaded, the CDR circuit 110 is set such that clock signals are regenerated from PAM4 signals TxDATAb1 to TxDATAb4 of a transmission data signal TxDATAb. Specifically, the value of the transmission rate of the PAM4 signal included in the application data 41 described later, which is 200 Gbps, is set as the transmission rate set value for the CDR circuit 110.

Furthermore, as described above with reference to FIG. 8, the application program 42 executes monitoring and control of the optical transceiver 1 in accordance with the CMIS specification. CMIS is an example of a second specification.

The application data 41 is data used during execution of the application program 42. The application data 41 includes a transceiver code for 200 G configuration, a threshold for alarm detection, a parameter for monitor conversion, various set values for transmitting and receiving PAM4 signals TxDATAb1 to TxDATAb4 and PAM4 signals RxDATAb1 to RxDATAb4, and the like. The various set values for transmitting and receiving the PAM4 signals TxDATAb1 to TxDATAb4 include values of transmission rate for the PAM4 signals TxDATAb1 to TxDATAb4 (second transmission rate) set for the CDR circuit 110. The ROM 101a is an example of a memory in which the first program and the second program are stored. The application data 41 and the application program 42 are an example of the second program.

After booting up, the processor 100 executes only one of the application program 32 and the application program 42 that is loaded to the RAM 101b. The keycode 30 and the keycode 40 indicate which one of the application program 32 and the application program 42 is a program to be executed preferentially and represent priority level of the programs. The keycode 30 and the keycode 40 are examples of execution information indicating a program to be executed by the processor 100 out of the first program and the second program.

For example, in the case where the number of programs for which priority level is indicated is two, the keycodes 30 and 40 are set to "ACT" indicating a program with high priority, which is to be executed, or "DEACT" indicating a program with low priority, which is not to be executed. "ACT" and "DEACT" may be indicated by bits, numerical values, or character strings.

In the boot process, the processor 100 refers to the keycode 30 and the keycode 40. In the case where the keycode 30 indicates "ACT" and the keycode 40 indicates "DEACT", the processor 100 reads the application program 32 from the ROM 101a, loads the application program 32 to the RAM 101b, and executes the application program 32. In contrast, in the case where the keycode 30 indicates "DEACT" and the keycode 40 indicates "ACT", the processor 100 reads the application program 42 from the ROM 101a, loads the application program 42 to the RAM 101b, and executes the application program 42.

Accordingly, in the case where the default program to be executed at first after booting up is the application program 32 with 100 G configuration, the keycode 30 indicates "ACT" and the keycode 40 indicates "DEACT". The default program may be the application program 42 with 200 G configuration.

When the optical transceiver 1 is connected to the connector 23a of the transmission apparatus 2a or the connector 23b of the transmission apparatus 2b and the power is turned on or when reset is done during execution of the application program 32 or the application program 42, the processor 100 executes the boot program 33 or 43 prior to the application program 32 or 42. There is no difference between the boot program 33 and the boot program 43. In accordance with the keycodes 30 and 40, one of the application program 32 and the application program 42 is read from the ROM 101a, loaded to the RAM 101b, and executed.

Process of Boot Programs 33 and 43

Figure 12:
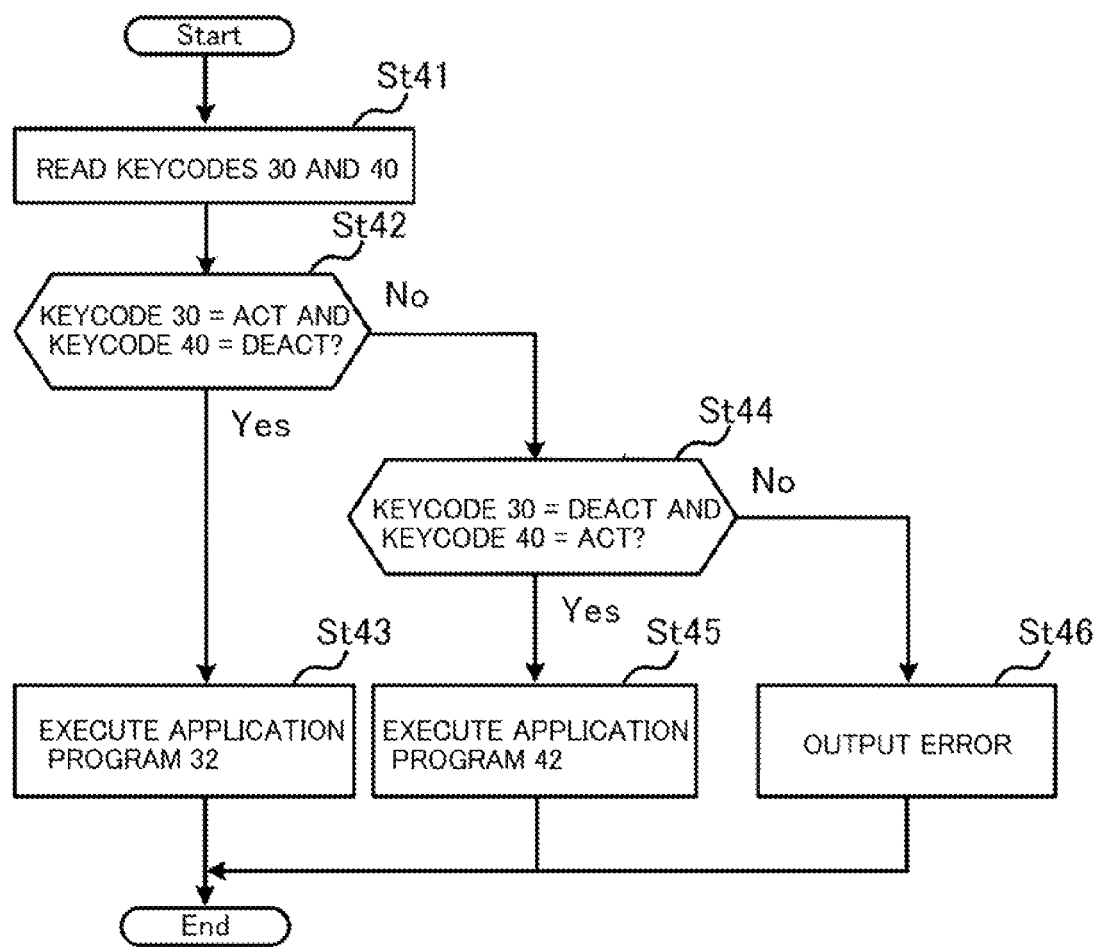
FIG. 12 is a flowchart illustrating an example of a process of a boot program.

FIG. 12 is a flowchart illustrating an example of the process of the boot program 33 and the boot program 43. In this embodiment, the boot program 33 and the boot program 43 are the same. At the time of booting up, such as turning on of the power of the optical transceiver 1, and at the time of reset during execution of the application program 32 or 42, the processor 100 executes the boot program 33 or the boot program 43. At the time of booting the microcontroller 10, the RAM 101b of the memory circuit 101 is in an initialized state. For such initialization, the processor 100 performs a cold boot as necessary, similarly to the time when the power is turned on. If a cold boot is not necessary, the processor 100 may perform a warm boot.

The processor 100 reads the keycode 30 and the keycode 40 from the ROM 101a (step St41). Next, the processor 100 determines whether the keycode 30 indicates "ACT" and the keycode 40 indicates "DEACT" (step St42).

In the case where the keycode 30 indicates "ACT" and the keycode 40 indicates "DEACT" (Yes in step St42), the processor 100 reads the application program 32 from the ROM 101a, loads the application program 32 to the RAM 101b, and executes the application program 32 (step St43).

In the case where the keycode 30 does not indicate "ACT" or the keycode 40 does not indicate "DEACT" (No in step St42), the processor 100 determines whether the keycode 30 indicates "DEACT" and the keycode 40 indicates "ACT" (step St44).

In the case where the keycode 30 indicates "DEACT" and the keycode 40 indicates "ACT" (Yes in step St44), the processor 100 reads the application program 42 from the ROM 101a, loads the application program 42 to the RAM 101b, and executes the application program 42 (step St45).

In the case where the keycode 30 does not indicate "DEACT" or the keycode 40 does not indicate "ACT" (No in step St44), the processor 100 outputs an error (step St46). In step St46, for example, the processor 100 outputs an error by illuminating a light emission diode (LED), which is not illustrated in figures. The error may be notified, by an alarm signal IntL, to the transmission apparatus 2a or the transmission apparatus 2b on which the optical transceiver 1 is mounted.

As described above, in the boot process, the processor 100 executes the boot program 33 and the boot program 43, reads the keycode 30 and the keycode 40 from the ROM 101a, reads one of the application program 32 and the application program 42 from the ROM 101a on the basis of the keycode 30 and the keycode 40, loads the read one of the application program 32 and the application program 42 to the RAM 101b, and executes the loaded one of the application program 32 and the application program 42.

In the boot program 33 and the boot program 43 according to this embodiment, a process is performed on the basis of the keycode 30 and the keycode 40. However, the boot program 33 and the boot program 43 may be performed on the basis of only one of the keycode 30 and the keycode 40. For example, in the case where the processor 100 reads the keycode 30, which indicates "ACT", the processor 100 may read the application program 32 from the ROM 101a, load the read application program 32 to the RAM 101b, and execute the loaded application program 32. In the case where the keycode 30 indicates "DEACT", the processor 100 may read the application program 42 from the ROM 101a, load the read application program 42 to the RAM 101b, execute the loaded application program 42. The process based on the keycode 40 is performed in a manner similar to that described above.

Process of Application Programs 32 and 42

Figure 13:
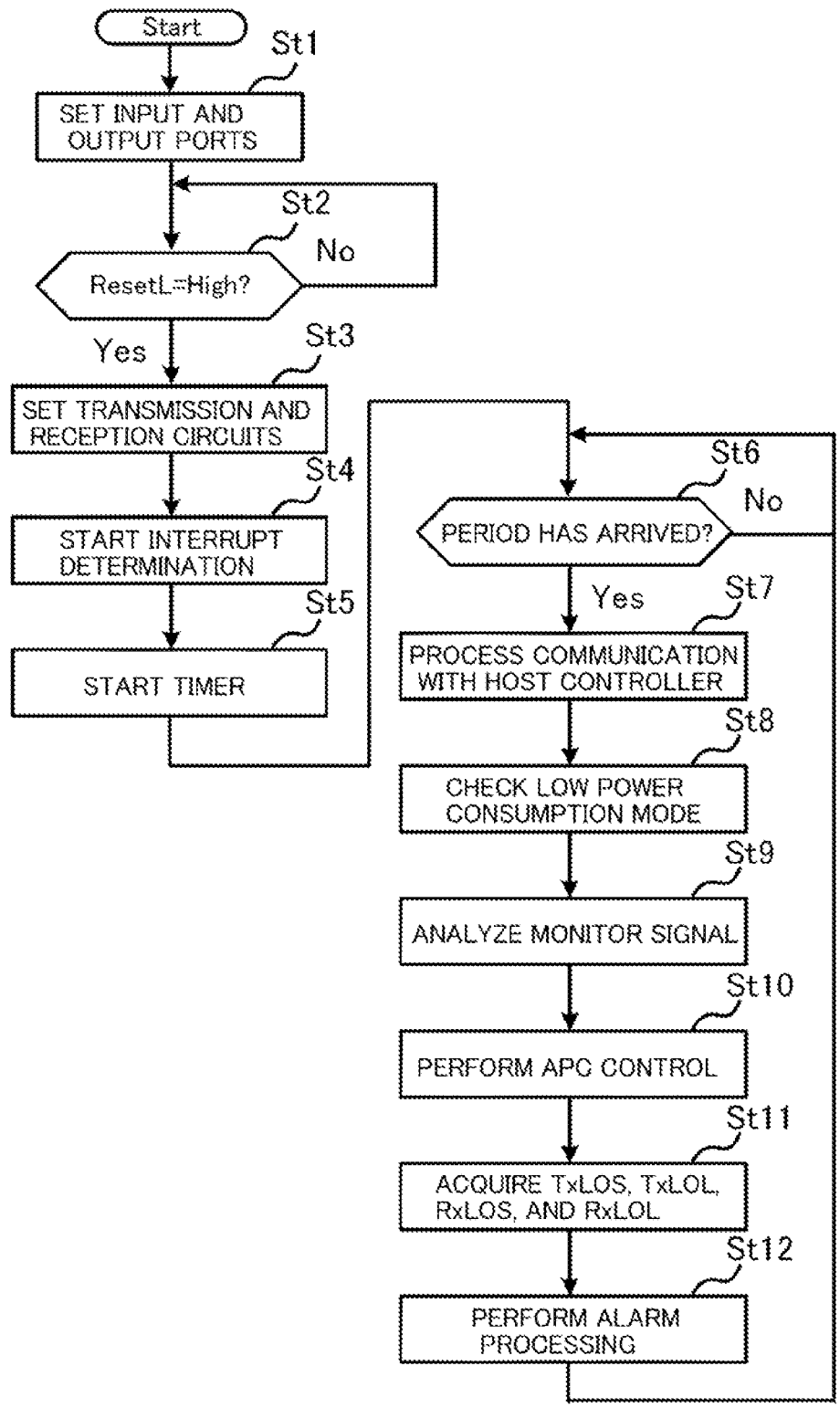
FIG. 13 is a flowchart illustrating an example of a process of an application program.

FIG. 13 is a flowchart illustrating an example of a process of the application program 32 and the application program 42. After the boot program 33 or the boot program 43 is executed, each of the application program 32 and the application program 42 is read from the ROM 101a, loaded to the RAM 101b, and executed. The application program 32 and the application program 42 are different in operation configurations and management interface specifications. However, in the explanation provided below, common procedures will be explained.

The processor 100 sets an input port and an output port for inputting and outputting various signals to and from the host controllers 20a and 20b, the transmission circuit 11, and the reception circuit 12 (step SU). Next, the processor 100 determines whether or not a reset signal ResetL is at High level (step St2). The reset signal ResetL is regarded as an instruction for releasing (High level) or maintaining (Low level) the reset state from the host controllers 20a and 20b.

In the case where the reset signal ResetL is at Low level (No in step St2), the processor 100 acknowledges that an instruction for maintaining the reset state is received from the host controller 20a or 20b, and executes step St2 again. In the case where the reset signal ResetL is at High level (Yes in step St2), the processor 100 acknowledges that an instruction for releasing the reset state is received from the host controller 20a or 20b, and sets operation configuration for the transmission circuit 11 and the reception circuit 12 (step St3).

In step St3, in the case where the processor 100 is executing the application program 32, the processor 100 sets 100 G configuration. For example, by executing the application program 32, the processor 100 sets the transmission rate set value for the CDR circuit 110 to the value of transmission rate of the NRZ signals TxDATAa1 to TxDATAa4 (first transmission rate) included in the application data 31. Specifically, the PLL circuits 110gp1 to 110gp4 included in the timing recovery circuits 110g1 to 110g4, respectively, of the CDR circuit 110 set the set frequencies of oscillators inside the PLL circuits 110gp1 to 110gp4 to frequencies that match the NRZ signals TxDATAa1 to TxDATAa4 in accordance with the transmission rate set value.

Furthermore, in the case where the processor 100 is executing the application program 42, the processor 100 sets 200 G configuration. For example, by executing the application program 42, the processor 100 sets the transmission rate set value for the CDR circuit 110 to the value of transmission rate of the PAM4 signals TxDATAb1 to TxDATAb4 (second transmission rate) included in the application data 41. Specifically, the PLL circuits 110gp1 to 110gp4 included in the timing recovery circuits 110g1 to 110g4, respectively, of the CDR circuit 110 set the set frequencies of oscillators inside the PLL circuits 110gp1 to 110gp4 to frequencies that match the PAM4 signals TxDATAb1 to TxDATAb4 in accordance with the transmission rate set value.

Next, the processor 100 starts an interrupt determination on the basis of the reset signal ResetL (step St4). The interrupt process will be described later.

Next, the processor 100 starts up the timer of the timer circuit 105 (step St5). The processor 100 manages, using the timer, a period during which routine processing from steps St7 to St12 is performed.

Next, the processor 100 determines, on the basis of the timer, whether or not the period of the routine processing has arrived (step St6). In the case where the period has not arrived (No in step St6), the processor 100 performs the processing of step St6 again. In the case where the period has arrived (Yes in step St6), the processor 100 sequentially performs processing of steps St7 to St12.

In the routine processing, the processor 100 processes communication through the I2C with the host controller 20a or the host controller 20b to which the microcontroller 10 is connected (step St7). The host controller 20a or the host controller 20b transmits various command messages and the like to the microcontroller 10 through the I2C. The processor 100 generates a response message to a command message, and transmits the response message to the host controller 20a or the host controller 20b through the I2C.

In step St7, in the case where the processor 100 is executing the application program 32, the processor 100 communicates with the host controller 20a or the host controller 20b to which the microcontroller 10 is connected, in accordance with SFF-8636. Therefore, in the case where the processor 100 is executing the application program 32, the processor 100 is not able to communicate with the host controller 20b, which performs communication in accordance with CMIS, through the I2C bus.

Meanwhile, in the case where the processor 100 is executing the application program 42, the processor 100 communicates with the host controller 20a or the host controller 20b to which the microcontroller 10 is connected, in accordance with CMIS. Therefore, in the case where the processor 100 is executing the application program 32, the processor 100 is not able to communicate with the host controller 20a, which performs communication in accordance with SFF-8636, through the I2C bus.

Next, the processor 100 checks a mode signal LPMode input from the host controller 20a or the host controller 20b (step St8). In the case where the mode signal LPMode indicates a low power consumption mode, the processor 100 controls the transmission circuit 11 and the reception circuit 12 to be in the low power consumption mode.

Next, the processor 100 analyzes a monitor signal input from the ADC 106 (step St9). For example, the processor 100 analyzes the temperature, power supply voltage, power of a transmission optical signal TxS, power of a reception optical signal RxS, a bias value of the LDD circuit 111, and the like on the basis of the monitor signal, and determines alarm or warning on the basis of the obtained result.

Next, the processor 100 performs automatic power control (APC) on the LDD circuit 111 (step St10). In step St10, the processor 100 compares the power of the transmission optical signal TxS, which is acquired from the monitor signal, with a target value, and adjusts a bias value of current of a driving signal for the LDD circuit 111 in accordance with a result of the comparison.

Next, the processor 100 acquires values of LOS signals TxLOS and RxLOS and LOL signals TxLOL and RxLOL input from the transmission circuit 11 and the reception circuit 12 (step St11). The LOS signal TxLOS and the LOL signal TxLOL are used for the interrupt process, which will be described later.

Next, the processor 100 performs processing for outputting an alarm and a warning on the basis of results of the processing from the steps St8 to St11 (step St12). An alarm and a warning are transmitted, by an alarm signal IntL, to the host controller 20a or the host controller 20b. For example, the processor 100 may output an error by illuminating an LED, which is not illustrated in figures.

The processor 100 performs monitoring and control of the optical transceiver 1 by the processing of steps St8 to St12. Monitoring and control is performed in accordance with SFF-8636 for the application program 32 and in accordance with CMIS for the application program 42.

The processor 100 transmits and receives, as messages, various types of information regarding monitoring and control of the optical transceiver 1 in the processing of step St7. Transmission and reception of a message is performed in accordance with SFF-8636 for the application program 32 and in accordance with CMIS for the application program 42. Therefore, by switching between the application program 32 and the application program 42, which will be described later, the processor 100 is capable of performing monitoring and control through the host controller 20a or the host controller 20b in accordance with a specification, SFF-8636 or CMIS, corresponding to the transmission rate of the transmission apparatus 2a or the transmission apparatus 2b on which the optical transceiver 1 is mounted.

Interrupt Process of Application Program 32 with 100 G Configuration

Figure 14:
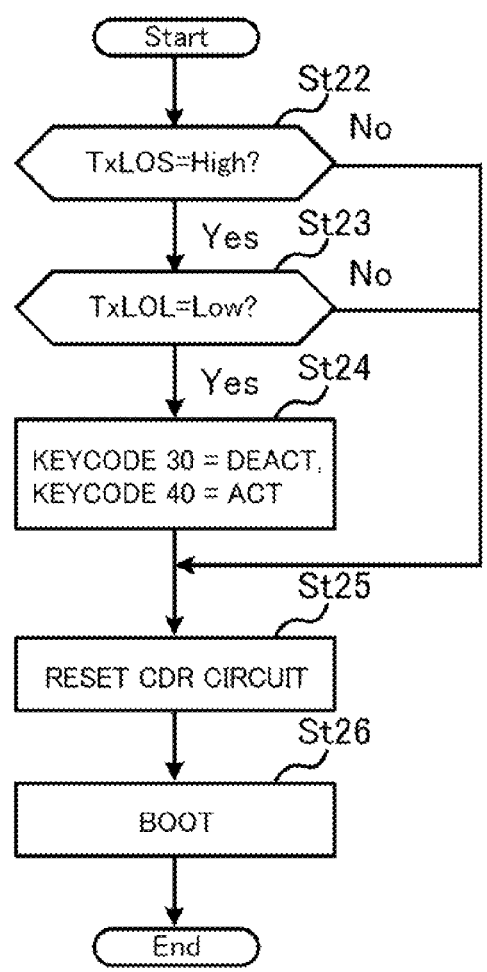
FIG. 14 is a flowchart illustrating an example of an interrupt process of an application program with 100 G configuration.

FIG. 14 is a flowchart illustrating an example of an interrupt process of the application program 32 with 100 G configuration. This process is performed in accordance with interruption by a reset signal ResetL in the processing of steps St6 to St12 of the application program 32.

When the reset signal ResetL becomes Low level, interruption occurs in the processor 100. When interruption occurs in the processor 100, the application program 32 performs the interrupt process illustrated in the flowchart of FIG. 14 in accordance with the occurrence of the interruption.

First, the processor 100 determines the level of a LOS signal TxLOS input from the CDR circuit 110 (step St22). Thus, the processor 100 determines whether or not NRZ signals TxDATAa1 to TxDATAa4 of a transmission data signal TxDATAa or PAM4 signals TxDATAb1 to TxDATAb4 of a transmission data signal TxDATAb are input to the transmission circuit 11 from the transmission apparatus 2a or the transmission apparatus 2b.

In the case where the LOS signal TxLOS is at High level (Yes in step St22), the processor 100 determines the level of a LOL signal TxLOL input from the CDR circuit 110 (step St23). Thus, the processor 100 determines whether or not clock signals are regenerated from the NRZ signals of the transmission data signal TxDATAa or the PAM4 signals of the transmission data signal TxDATAb in the CDR circuit 110. The determination as to whether or not clock signals are regenerated in the CDR circuit 110 is not necessarily performed on the basis of the LOL signal TxLOL. For example, the processor 100 may determine, by reading state registers inside the processor 100 through the SPI, whether or not clock signals are regenerated in the CDR circuit 110.

In the case where the LOL signal TxLOL is at Low level (Yes in step St23), the processor 100 determines that the current transmission rate set value for 100 G configuration is different from the value of the transmission rate of the transmission apparatus 2a or 2b on which the optical transceiver 1 is mounted, and updates the keycode 30 and the keycode 40 to "DEACT" and "ACT", respectively, so that the application program 42 with 200 G configuration will be executed at the next booting up (step St24). That is, the priority level of the application program 32, which is being executed, is set to be lower than the priority level of the application program 42, which is not currently being executed.

In the case where 100 G configuration is set by the application program 32, the CDR circuit 110 is able to regenerate clock signals from the NRZ signals TxDATAa1 to TxDATAa4 of the transmission data signal TxDATAa at 100 Gbps, whereas the CDR circuit 110 does not regenerate clock signals from the PAM4 signals TxDATAb1 to TxDATAb4 of the transmission data signal TxDATAb at 200 Gbps. Therefore, the processor 100 is able to determine, in accordance with whether or not clock signals are regenerated in the CDR circuit 110, whether or not the transmission rate set value for 100 G configuration is equal to the value of the transmission rate of the transmission apparatus 2a or the transmission apparatus 2b to which the optical transceiver 1 is connected. In the case where the transmission rate set value for 100 G configuration is different from the value of the transmission rate of an electrical signal input from a transmission apparatus, the processor 100 updates the keycode 30 indicating the priority level of the application program 32, which is being executed, and the keycode 40 indicating the priority level of the application program 42, which is not being executed, so that the application program 42 with 200 G configuration is changed to the program to be executed at the next booting up.

Next, the processor 100 resets the CDR circuit 110 and the CDR circuit 120 in accordance with a reset signal TxRST (step St25). Accordingly, the operation configuration of the CDR circuits 110 and 120 is released.

Next, the processor 100 executes booting up (step St26). Accordingly, the processor 100 stops the operation of the application program 32 and executes the boot program 43. Thus, the application program 42 with 200 G configuration is executed in accordance with the updated keycode 30 and keycode 40.

As described above, in the case where it is determined that the CDR circuit 110 does not regenerate clock signals, the processor 100 resets the PLL circuits 110gp1 to 110gp4 in the timing recovery circuits 110g1 to 110g4 of the CDR circuit 110, prior to booting up. Thus, the processor 100 is capable of appropriately controlling the relation between the timing of restart of the PLL circuits 110gp1 to 110gp4 and the timing of execution of the application program 42.

Furthermore, in the case where the LOS signal TxLOS is at Low level (No in step St22), the processor 100 is not able to determine whether or not the transmission rate set value for 100 G configuration is equal to the value of the transmission rate of an electrical signal input from a transmission apparatus because neither the transmission data signal TxDATAa nor the transmission data signal TxDATAb is input to the transmission circuit 11. Thus, the processor 100 performs the processing of steps St25 and St26, without performing the processing (step St24) for updating the keycode 30 and the keycode 40.

Thus, after execution of the boot program 33, the application program 32 with 100 G configuration is executed again. That is, in the case where neither the transmission data signal TxDATAa nor the transmission data signal TxDATAb is input, the processor 100 maintains the state in which the priority level of the application program 32 with 100 G configuration is higher than the priority level of the application program 42 with 200 G configuration, and boots up. Thus, for example, a situation in which the application program 42 with 200 G configuration is falsely executed when the transmission apparatus 2a or the transmission apparatus 2b on which the optical transceiver 1 is mounted is in the process of startup and cannot output a transmission data signal TxDATAa or a transmission data signal TxDATAb, is prevented.

In the case where the LOL signal is at High level (No in step St23), the processor 100 determines that the current transmission rate set value for 100 G configuration is equal to the value of the transmission rate of the transmission apparatus 2a or 2b on which the optical transceiver 1 is mounted, and performs the processing of steps St25 and St26 without performing the processing (step St24) for updating the keycode 30 and the keycode 40. Thus, execution of the application program 42 with 200 G configuration, which does not match the transmission rate of the transmission apparatus 2a or 2b on which the optical transceiver 1 is mounted, is prevented.

Interrupt Process of Application Program 42 with 200 G Configuration

Figure 15:
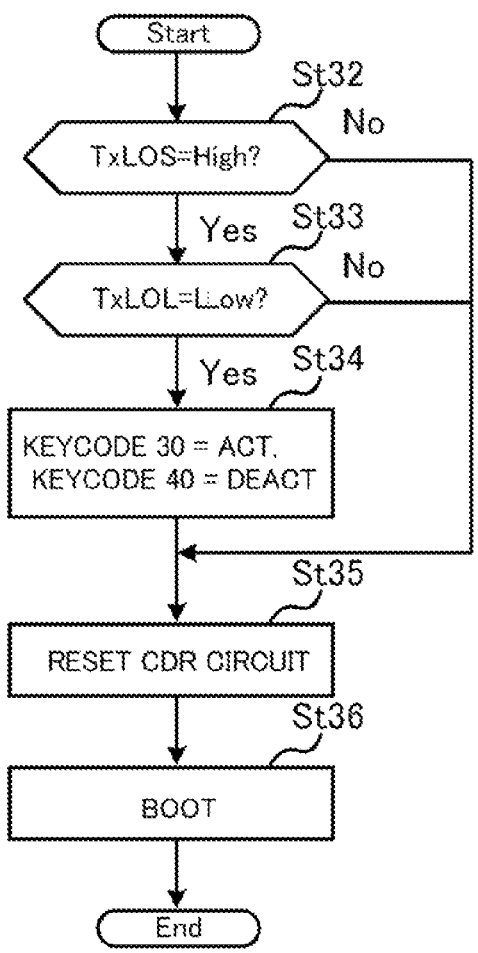
FIG. 15 is a flowchart illustrating an example of an interrupt process of an application program with 200 G configuration.

FIG. 15 is a flowchart illustrating an example of an interrupt process of the application program 42 with 200 G configuration. This process is performed in accordance with interruption by a reset signal ResetL in the processing of steps St6 to St12 of the application program 42.

When the reset signal ResetL becomes Low level, interruption occurs in the processor 100. When interruption occurs in the processor 100, the application program 42 performs the interrupt process illustrated in the flowchart of FIG. 15 in accordance with the occurrence of the interruption.

First, the processor 100 determines the level of a LOS signal TxLOS input from the CDR circuit 110 (step St32). Thus, the processor 100 determines whether or not NRZ signals TxDATAa1 to TxDATAa4 of a transmission data signal TxDATAa or PAM4 signals TxDATAb1 to TxDATAb4 are input to the transmission circuit 11 from the transmission apparatus 2a or the transmission apparatus 2b.

In the case where the LOS signal TxLOS is at High level (Yes in step St32), the processor 100 determines the level of a LOL signal TxLOL input from the CDR circuit 110 (step St33). Thus, the processor 100 determines whether or not clock signals are regenerated from the transmission data signal TxDATAa or the transmission data signal TxDATAb in the CDR circuit 110.

In the case where the LOL signal TxLOL is at Low level (Yes in step St33), the processor 100 determines that the current transmission rate set value for 200 G configuration is different from the value of the transmission rate of the transmission apparatus 2a or 2b on which the optical transceiver 1 is mounted, and updates the keycode 30 and the keycode 40 to "ACT" and "DEACT", respectively, so that the application program 32 with 100 G configuration will be executed at the next booting up (step St34).

In the case where 200 G configuration is set by the application program 42, the CDR circuit 110 is able to regenerate clock signals from the PAM4 signals TxDATAb1 to TxDATAb4 of the transmission data signal TxDATAb at 200 Gbps, whereas the CDR circuit 110 does not regenerate clock signals from the NRZ signals TxDATAa1 to TxDATAa4 of the transmission data signal TxDATAa at 100 Gbps. Therefore, the processor 100 is able to determine, in accordance with whether or not clock signals are regenerated in the CDR circuit 110, whether or not the transmission rate set value for 200 G configuration is equal to the value of the transmission rate of the transmission apparatus 2a or the transmission apparatus 2b to which the optical transceiver 1 is connected. In the case where the transmission rate set value for 200 G configuration is different from the value of the transmission rate of an electrical signal input from a transmission apparatus, the processor 100 updates the keycode 30 indicating the priority level of the application program 32, which is not being executed, and the keycode 40 indicating the priority level of the application program 42, which is being executed, so that the application program 32 with 100 G configuration is changed to the program to be executed at the next booting up.

Next, the processor 100 resets the CDR circuit 110 and the CDR circuit 120 in accordance with a reset signal TxRST (step St35). Accordingly, the operation configuration of the CDR circuits 110 and 120 is released.

Next, the processor 100 executes booting up (step St36). Accordingly, the processor 100 stops the operation of the application program 42 and executes the boot program 33. Thus, the application program 32 with 100 G configuration is executed in accordance with the updated keycode 30 and keycode 40.

As described above, in the case where it is determined that the CDR circuit 110 does not regenerate clock signals, the processor 100 resets the PLL circuits 110gp1 to 110gp4 in the timing recovery circuits 110g1 to 110g4 of the CDR circuit 110, prior to booting up. Thus, the processor 100 is capable of appropriately controlling the relation between the timing of restart of the PLL circuits 110gp1 to 110gp4 and the timing of execution of the application program 32.

Furthermore, in the case where the LOS signal TxLOS is at Low level (No in step St32), the processor 100 is not able to determine whether or not the transmission rate set value for 200 G configuration is equal to the value of the transmission rate of an electrical signal input from a transmission apparatus because neither the transmission data signal TxDATAa nor the transmission data signal TxDATAb is input to the transmission circuit 11. Thus, the processor 100 performs the processing of steps St35 and St36, without performing the processing (step St34) for updating the keycode 30 and the keycode 40.

Thus, after execution of the boot program 43, the application program 42 with 200 G configuration is executed again. That is, in the case where neither the transmission data signal TxDATAa nor the transmission data signal TxDATAb is input, the processor 100 maintains the state in which the priority level of the application program 42 with 200 G configuration is higher than the priority level of the application program 32 with 100 G configuration, and boots up. Thus, for example, a situation in which the application program 32 with 100 G configuration is falsely executed when the transmission apparatus 2a or the transmission apparatus 2b on which the optical transceiver 1 is mounted is in the process of startup and cannot output a transmission data signal TxDATAa or a transmission data signal TxDATAb, is prevented.

In the case where the LOL signal TxLOL is at High level (No in step St33), the processor 100 determines that the current transmission rate set value for 200 G configuration is equal to the transmission rate of the transmission apparatus 2a or 2b on which the optical transceiver 1 is mounted, and performs the processing of steps St35 and St36, without performing the processing (step St34) for updating the keycode 30 and the keycode 40. Thus, execution of the application program 32 with 100 G configuration, which does not match the transmission rate of the transmission apparatus 2a or 2b on which the optical transceiver 1 is mounted, is prevented.

As described above, when the processor 100 executes one of the application program 32 and the application program 42 that has a higher priority level, the processor 100 determines whether or not a clock signal is regenerated from a transmission data signal TxDATAa or a transmission data signal TxDATAb in the CDR circuit 110, in accordance with an interrupt request from the transmission apparatus 2a or 2b. In the case where it is determined that the CDR circuit 110 does not regenerate a clock signal, the processor 100 changes the priority level of the application program 32 or 42 that is being executed to be lower than the priority level of the application program 42 or 32 that is not being executed. Then, the processor 100 boots.

Thus, in accordance with an interrupt request from the host controller 20a or the host controller 20b to which the microcontroller 10 is connected, without performing communication through the I2C with the host controller 20a or the host controller 20b to which the microcontroller 10 is connected, the processor 100 is able to determine, in accordance with regeneration or non-regeneration of a clock signal from the transmission data signal TxDATAa or the transmission data signal TxDATAb, whether or not the value of the transmission rate of the transmission apparatus 2a or the transmission apparatus 2b on which the optical transceiver 1 is mounted is equal to the current transmission rate set value.

In the case where the value of the transmission rate of the transmission apparatus 2a or the transmission apparatus 2b on which the optical transceiver 1 is mounted is different from the current transmission rate set value, the processor 100 changes the priority level of the application program 32 or the application program 42 that is being executed to be lower than the priority level of the application program 32 or the application program 42 that is not being executed and boots up. Thus, the processor 100 is able to switch to the application program 32 or the application program 42 that has the same transmission rate set value as the value of the transmission rate of the transmission apparatus. The processor 100 may change the priority level of the application program 32 or the application program 42 that is being executed. Furthermore, the processor 100 may change the priority level of the application program 32 or the application program 42 that is not being executed. Furthermore, the processor 100 may change both the priority level of the application program 32 or the application program 42 that is being executed and the priority level of the application program 32 or the application program 42 that is not being executed.

Accordingly, when an apparatus on which the optical transceiver 1 is mounted is changed from one of the transmission apparatus 2a and the transmission apparatus 2b to the other one of the transmission apparatus 2a and the transmission apparatus 2b, the optical transceiver 1 is able to execute the application program 32 or the application program 42 that has an operation configuration with a transmission rate set value that is equal to the value of the transmission rate of the other one of the transmission apparatus 2a and the transmission apparatus 2b, without downloading a program from the outside. Therefore, the optical transceiver 1 is able to set a transmission rate set value suitable for the transmission apparatus 2a or the transmission apparatus 2b on which the optical transceiver 1 is mounted.

Furthermore, in the process of booting up, the processor 100 executes one of the boot program 33 and the boot program 43, reads the keycode 30 and the keycode 40 from the ROM 101a, and executes one of the application program 32 and the application program 42 on the basis of the keycode 30 and the keycode 40. In the case where it is determined that the CDR circuit 110 does not regenerate a clock signal, the processor 100 updates the keycode 30 and the keycode 40 such that the other one of the application program 32 and the application program 42 becomes a program to be executed, and boots up.

Furthermore, the keycode 30 and the keycode 40 indicating priority level indicating a program to be executed are not limited to information "ACT" and "DEACT". For example, an identifier representing a program to be executed may be stored in one of the block #0 and the block #1 of the ROM 101a, and the processor 100 may switch between the application program 32 and the application program 42 in accordance with the identifier. Furthermore, the keycode 30 and the keycode 40 may indicate numerical values as priority level. In the case where the keycode 30 and the keycode 40 indicate numerical values representing priority level, the processor 100 compares the numerical value of the keycode 30 with the numerical value of the keycode 40, and determines, on the basis of the result of the comparison, a program to be executed. In the case where priority level is indicated by a numerical value, a larger numerical value may represent a higher priority level or a smaller numerical value may represent a higher priority level.

Furthermore, in the case where the transmission data signal TxDATAa or the transmission data signal TxDATAb is input to the transmission circuit 11 and it is determined that a clock signal is not regenerated, the processor 100 switches a program to be executed between the application program 32 and the application program 42. In contrast, in the case where neither the transmission data signal TxDATAa nor the transmission data signal TxDATAb is input to the transmission circuit 11, the processor 100 continues execution of the application program 32 or the application program 42 that is being executed.

Therefore, for example, a situation in which switching between the application program 32 and the application program 42 is falsely performed when the transmission apparatus 2a or the transmission apparatus 2b on which the optical transceiver 1 is mounted is in the process of startup and cannot output a transmission data signal TxDATAa or a transmission data signal TxDATAb, is prevented.

The optical transceiver 1 according to this embodiment includes the transmission circuit 11 and the reception circuit 12. However, the optical transceiver 1 may include only the transmission circuit 11. Furthermore, although the transmission circuit 11 and the reception circuit 12 process the transmission data signal TxDATAa and the transmission data signal TxDATAb, and the reception data signal RxDATAa and the reception data signal RxDATAb, respectively, at a transmission rate corresponding to the same operation configuration. However, the transmission circuit 11 and the reception circuit 12 may process the transmission data signal TxDATAa and the transmission data signal TxDATAb, and the reception data signal RxDATAa and the reception data signal RxDATAb, respectively, at different transmission rates based on different operation configurations.

Although the microcontroller 10 is used in this embodiment, the microcontroller 10 is not necessarily used. For example, in place of the microcontroller 10, a field programmable gate array (FPGA) or a programmable logic device (PLD) that includes a processor and a memory built therein may be used or a processor and a memory formed as separate chips may be used.

Furthermore, the CDR circuit 110 in this embodiment includes the four PLL circuits, the PLL circuits 110gp1 to 110gp4, in association with the timing recovery circuits 110g1 to 110g4, respectively. However, a clock regenerated in a single PLL circuit may be used on four lanes in a shared manner.

Furthermore, determination of a LOL signal TxLOL in the CDR circuit 110 is not necessarily performed in accordance with a method used in the embodiment described above. For example, in the case where the control circuit 110d of the CDR circuit 110 receives LOL signals S_LOL from all the timing recovery circuits 110g1 to 110g4, the LOL signal TxLOL may be set to Low level. Furthermore, in the case where the control circuit 110d of the CDR circuit 110 receives a LOL signal S_LOL from a specific timing recovery circuit (for example, the timing recovery circuit 110g1) out of the timing recovery circuits 110g1 to 110g4, the LOL signal TxLOL may be set to Low level.

In the present disclosure, a preferred embodiment has been described above. However, the present disclosure is not limited to the preferred embodiment described above and may be implemented by making various changes without departing from the scope of the gist of the present disclosure.

What is claimed is:

1. An optical transceiver that is pluggable to any one of a first apparatus that transmits a first electrical signal at a first transmission rate and a second apparatus that transmits a second electrical signal at a second transmission rate different from the first transmission rate, the optical transceiver comprising:
   a clock recovery circuit that is capable of regenerating a clock signal from any one of the first electrical signal transmitted at the first transmission rate and the second electrical signal transmitted at the second transmission rate;
   a memory that stores a first program including a value of the first transmission rate and a second program including a value of the second transmission rate; and
   a processor that executes one of the first program and the second program that has a higher priority level, in a boot process,
   wherein the clock recovery circuit does not regenerate the clock signal in a case where a transmission rate real value which becomes the value of the first transmission rate when the optical transceiver is plugged to the first apparatus or alternatively the value of the second transmission rate when the optical transceiver is plugged to the second apparatus is different from a transmission rate set value, and the clock recovery circuit regenerates the clock signal in a case where the transmission rate real value is equal to the transmission rate set value,
   wherein in a case where the optical transceiver is plugged to one of the first apparatus and the second apparatus, the processor boots up and executes one of the first program and the second program that has a higher priority level, sets the value of the first transmission rate or the value of the second transmission rate included in the first program or the second program that is being executed to the transmission rate set value, and operates the clock recovery circuit, and
   wherein in a case where the clock recovery circuit does not regenerate the clock signal from the first electrical signal or the second electrical signal transmitted from the first apparatus or the second apparatus, in accordance with an interrupt request from the first apparatus or the second apparatus to which the optical transceiver is plugged, the processor sets the priority level of the first program or the second program that is being executed to be lower than the priority level of the first program or the second program that is not being executed, and boots up.

2. The optical transceiver according to claim 1,
   wherein the clock recovery circuit outputs a first alarm signal indicating non-regeneration of the clock signal to the processor, and
   wherein the processor determines, based on the first alarm signal from the clock recovery circuit, whether or not the clock signal is regenerated.

3. The optical transceiver according to claim 2,
   wherein in a case where the processor determines that the clock recovery circuit does not regenerate the clock signal, the processor resets the clock recovery circuit prior to the boot process.

4. The optical transceiver according to claim 1,
   wherein the processor receives from the clock recovery circuit a second alarm signal indicating whether or not the first electrical signal or the second electrical signal is input from the first apparatus or the second apparatus to which the optical transceiver is plugged,
   wherein in a case where the processor determines, based on the second alarm signal, that the clock signal is not regenerated in a state in which the first electrical signal or the second electrical signal is input to the clock recovery circuit, in accordance with the interrupt request, the processor changes priority level such that the priority level of the first program or the second program that is being executed is lower than the priority level of the first program or the second program that is not being executed, and boots up, and
   wherein in a case where the processor determines that the clock signal is not regenerated in a state in which neither the first electrical signal nor the second electrical signal is input to the clock recovery circuit, the processor maintains the priority level of the first program or the second program that is being executed to be higher than the priority level of the first program or the second program that is not being executed.

5. The optical transceiver according to claim 1,
   wherein during execution of the first program, the processor transmits and receives information regarding monitoring and control to and from the first apparatus in accordance with a first specification, and wherein during execution of the second program, the processor transmits and receives information regarding monitoring and control to and from the second apparatus in accordance with a second specification.

6. A control method for an optical transceiver pluggable to any one of a first apparatus that transmits a first electrical signal at a first transmission rate and a second apparatus that transmits a second electrical signal at a second transmission rate different from the first transmission rate, wherein the optical transceiver includes a clock recovery circuit that is capable of regenerating a clock signal from any one of the first electrical signal transmitted at the first transmission rate and the second electrical signal transmitted at the second transmission rate, a memory that stores a first program including a value of the first transmission rate and a second program including a value of the second transmission rate, and a processor that is capable of executing any one of the first program and the second program, wherein the clock recovery circuit does not regenerate the clock signal in a case where a transmission rate real value which becomes the value of the first transmission rate when the optical transceiver is plugged to the first apparatus or alternatively the value of the second transmission rate when optical transceiver is plugged to the second apparatus is different from a transmission rate set value, and the clock recovery circuit regenerates the clock signal in a case where the transmission rate real is equal to the transmission rate set value, wherein in a case where the optical transceiver is plugged to one of the first apparatus and the second apparatus, the optical transceiver executes one of the first program and the second program that has a higher priority level, so that the processor sets the value of the first transmission rate or the value of the second transmission rate included in the first program or the second program that is being executed to the transmission rate set value and operates the clock recovery circuit, and wherein in a case where the clock recovery circuit does not regenerate the clock signal from the first electrical signal or the second electrical signal transmitted from the first apparatus or the second apparatus to which the optical transceiver is plugged, in accordance with an interrupt request from the first apparatus or the second apparatus to which the optical transceiver is plugged, the processor sets the priority level of the first program or the second program that is being executed to be lower than the priority level of the first program or the second program that is not being executed, and boots up.

* * * * *